(12) United States Patent
Berg et al.

(10) Patent No.: US 9,112,792 B2
(45) Date of Patent: Aug. 18, 2015

(54) HOSTING DEVICE-SPECIFIC EDGE APPLICATIONS AT THE EDGE OF A MOBILE DATA NETWORK

(75) Inventors: William F. Berg, Rochester, MN (US); Michael T. Kalmbach, Elgin, MN (US); Mark D. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 13/443,257

(22) Filed: Apr. 10, 2012

(65) Prior Publication Data
US 2013/0265936 A1 Oct. 10, 2013

(51) Int. Cl.
*H04W 4/00* (2009.01)
*H04L 12/707* (2013.01)
*H04W 8/08* (2009.01)
*H04L 29/06* (2006.01)

(52) U.S. Cl.
CPC ............... *H04L 45/22* (2013.01); *H04W 4/003* (2013.01); *H04W 8/082* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 6,119,003 A * | 9/2000 | Kukkohovi | 455/435.2 |
| 6,332,139 B1 * | 12/2001 | Kaneko et al. | 1/1 |
| 6,519,461 B1 | 2/2003 | Andersson et al. | |
| 7,483,408 B2 | 1/2009 | Bevan et al. | |
| 7,499,437 B2 | 3/2009 | Das et al. | |
| 7,724,707 B2 | 5/2010 | Foster et al. | |
| 7,916,649 B2 | 3/2011 | Buvaneswari et al. | |
| 8,036,214 B2 | 10/2011 | Elliott et al. | |
| 8,432,871 B1 | 4/2013 | Sarnaik et al. | |
| 8,520,615 B2 | 8/2013 | Mehta et al. | |
| 8,743,690 B1 | 6/2014 | Janarthanan et al. | |
| 8,767,544 B1 * | 7/2014 | Khanka et al. | 370/232 |
| 8,792,353 B1 | 7/2014 | Janarthanan et al. | |
| 8,792,495 B1 | 7/2014 | Dixon et al. | |
| 2004/0146027 A1 | 7/2004 | Shinozaki et al. | |
| 2004/0174834 A1 * | 9/2004 | Yoshida et al. | 370/315 |
| 2005/0204390 A1 | 9/2005 | Hofmann et al. | |
| 2005/0266799 A1 | 12/2005 | Hara et al. | |
| 2006/0050680 A1 | 3/2006 | Naim et al. | |
| 2007/0127443 A1 | 6/2007 | Spencer et al. | |
| 2008/0005806 A1 * | 1/2008 | Alve | 726/30 |

(Continued)

FOREIGN PATENT DOCUMENTS

WO WO2011018235l A1 2/2011

OTHER PUBLICATIONS

Kushanava Laha, "Race to the Cloud: Are Telcos Ready for What Lies Ahead?", May 18, 2011.

(Continued)

*Primary Examiner* — Kodzovi Acolatse
(74) *Attorney, Agent, or Firm* — Martin & Associates, LLC; Derek P. Martin

(57) ABSTRACT

Mobile network services are performed in a mobile data network in a way that is transparent to most of the existing equipment in the mobile data network. The mobile data network includes a radio access network and a core network. A breakout component in the radio access network breaks out data coming from a basestation, and hosts device-specific edge applications that perform one or more mobile network services at the edge of the mobile data network based on the broken out data.

7 Claims, 32 Drawing Sheets

(56) References Cited

U.S. PATENT DOCUMENTS

| | | | |
|---|---|---|---|
| 2008/0137541 A1 | 6/2008 | Agarwal et al. | |
| 2008/0139249 A1* | 6/2008 | Kim | 455/561 |
| 2008/0267128 A1 | 10/2008 | Bennett et al. | |
| 2008/0293413 A1 | 11/2008 | Sharif-Ahmadi et al. | |
| 2009/0122712 A1 | 5/2009 | Sharif-Ahmadi et al. | |
| 2009/0232015 A1 | 9/2009 | Domschitz et al. | |
| 2010/0130170 A1 | 5/2010 | Liu et al. | |
| 2010/0292556 A1* | 11/2010 | Golden | 600/364 |
| 2011/0070906 A1 | 3/2011 | Chami et al. | |
| 2011/0075675 A1 | 3/2011 | Koodli et al. | |
| 2011/0103310 A1 | 5/2011 | Stojanovski et al. | |
| 2011/0111781 A1* | 5/2011 | Chen et al. | 455/507 |
| 2011/0235595 A1 | 9/2011 | Mehta et al. | |
| 2012/0082073 A1 | 4/2012 | Andreasen et al. | |
| 2012/0082093 A1 | 4/2012 | Andreasen et al. | |
| 2012/0082094 A1 | 4/2012 | Andreasen et al. | |
| 2012/0082132 A1 | 4/2012 | Andreasen et al. | |
| 2012/0082146 A1 | 4/2012 | Andreasen et al. | |
| 2012/0188895 A1 | 7/2012 | Punz et al. | |
| 2012/0243432 A1 | 9/2012 | Liebsch et al. | |
| 2012/0244861 A1 | 9/2012 | Agarwal et al. | |
| 2014/0022985 A1 | 1/2014 | Kalmbach et al. | |
| 2014/0219242 A1* | 8/2014 | Perras et al. | 370/331 |

OTHER PUBLICATIONS

"Telco App Stores: A Bridge Too Far?", Executive Summary, Oct. 24, 2011, http://www.heavyreading.com/details.asp?sku_id=2481&skuitem_itemid=1223.

Melanie Posey, "Telcos in the Cloud: Claiming a Seat at the Table," IDC #219439, vol. 1, Jul. 2009.

Eric Schonfeld, "The Kindle Fire Will Have a Whole New "Cloud Accelerated" Mobile Browser Called Amazon Silk," http://techcrunch.com/2011/09/28/amazon-silk, Sep. 28, 2011.

Whatis.com, "Monitoring Enterprise IT Should be this Easy," Mar. 2, 2012, http://whatis.techtarget.com/definition/0,,sid9_gci211731.00.html.

Pending U.S. Appl. No. 13/297,770, "Data Breakout at the Edge of a Mobile Data Network," filed Nov. 16, 2011 by Bruce O. Anthony, Jr. et al.

Pending U.S. Appl. No. 13/297,807, "Data Breakout Appliance at the Edge of a Mobile Data Network," filed Nov. 16, 2011 by William F. Berg et al.

Pending U.S. Appl. No. 13/332,327, "Hosting Edge Applications at the Edge of a Mobile Data Network," filed Dec. 20, 2011 by William F. Berg et al.

Kundalkar et al., "LIPA: Local IP Access via Home Node B", Nov. 13, 2009.

Kushanava, Lana, "Race to the Cloud: Are Telcos Ready for What Lies Ahead?", May 18, 2011.

Telco App Stores: A Bridge Too Far?, Executive Summary, Oct. 24, 2011.

Posey, Melanie, Telcos in the Cloud: Claiming a Seat at the Table, IDC #219439, vol. 1, Jul. 2009.

Falconetti et al., "Distributed Uplink Macro Diversity for Cooperating Base Stations," IEEE International Conference on Communications Workshops, 2009, pp. 1-5.

Pending U.S. Patent Application entitled "Mobile Network Services in a Mobile Data Network", U.S. Appl. No. 13/233,812, filed Sep. 15, 2011 by Bruce O. Anthony, Jr. et al.

Pending U.S. Patent Application entitled "Hosting Edge Applications at the Edge of a Mobile Data Network", U.S. Appl. No. 13/332,327, filed Feb. 29, 2012 by William F. Berg et al.

\* cited by examiner

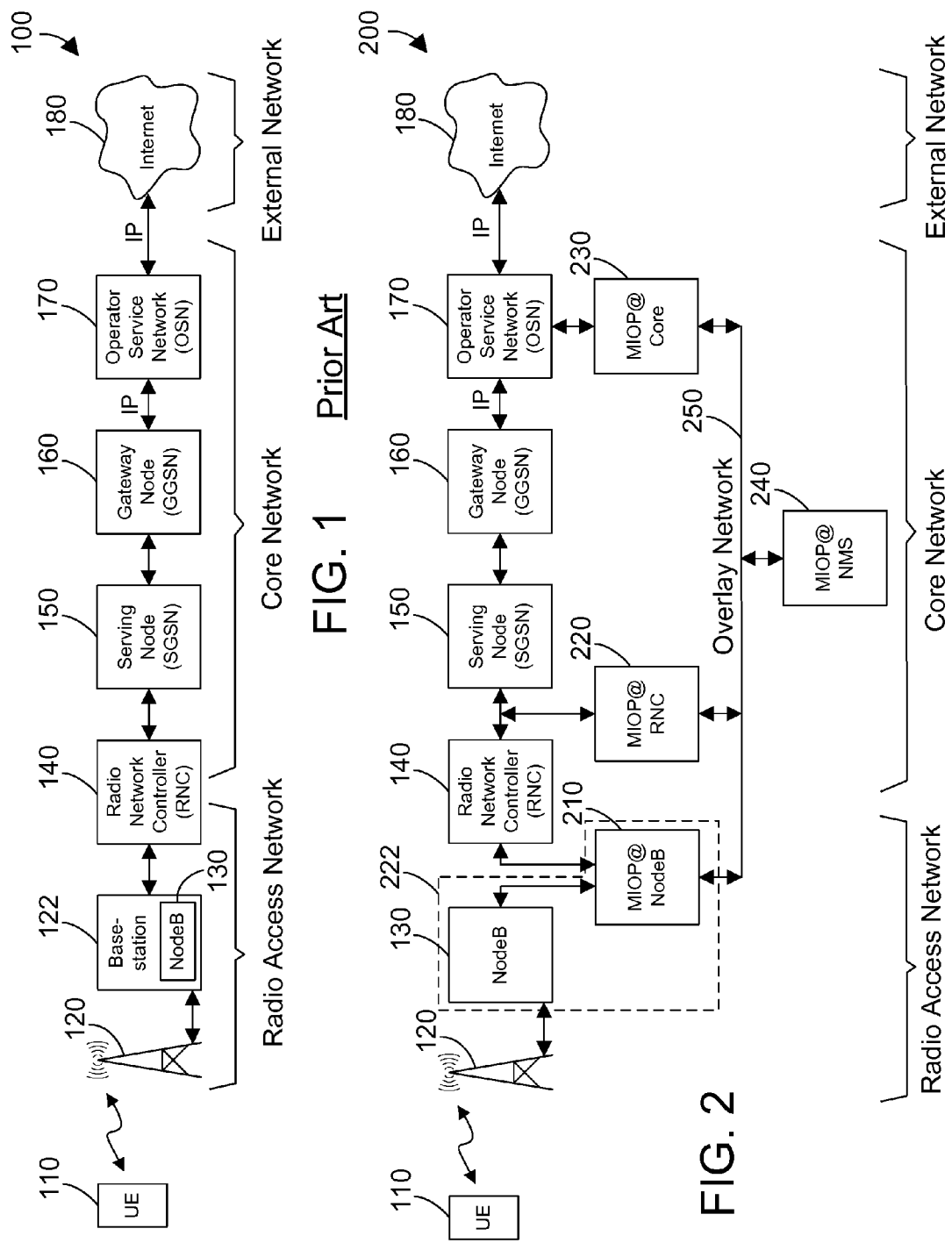

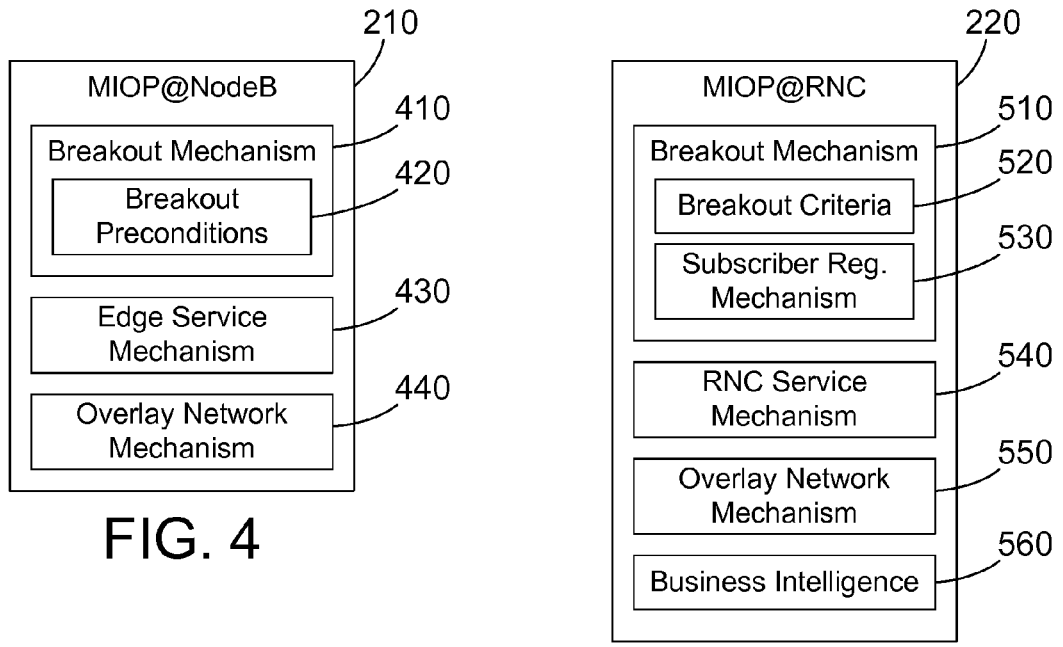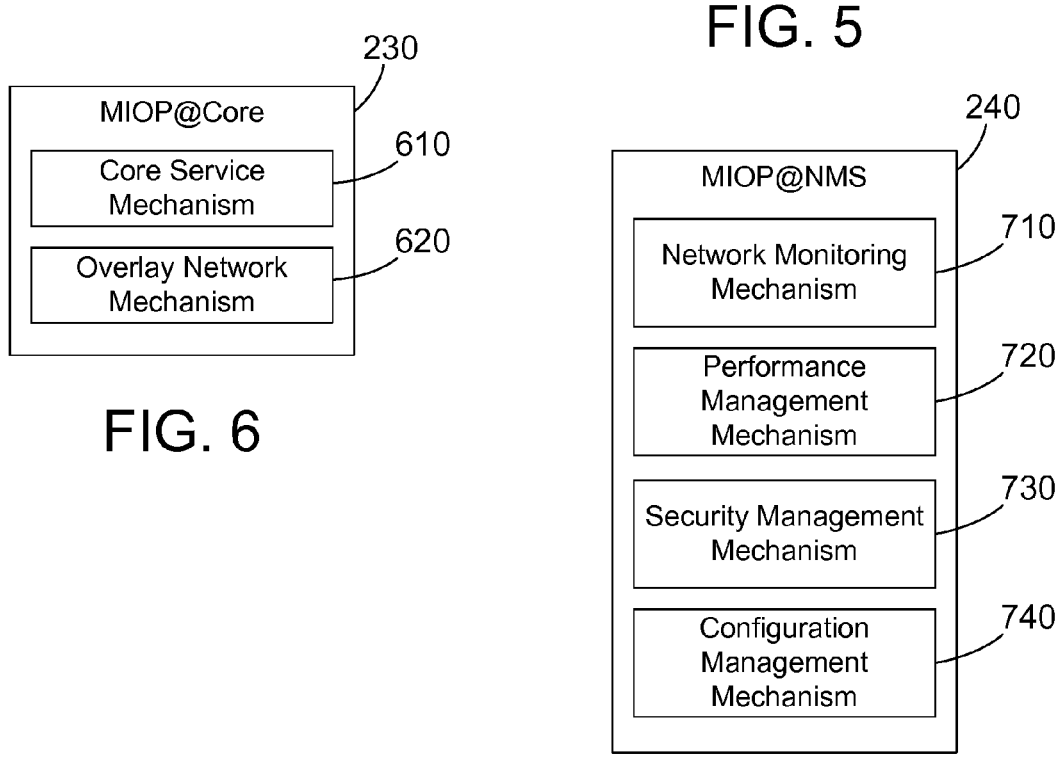

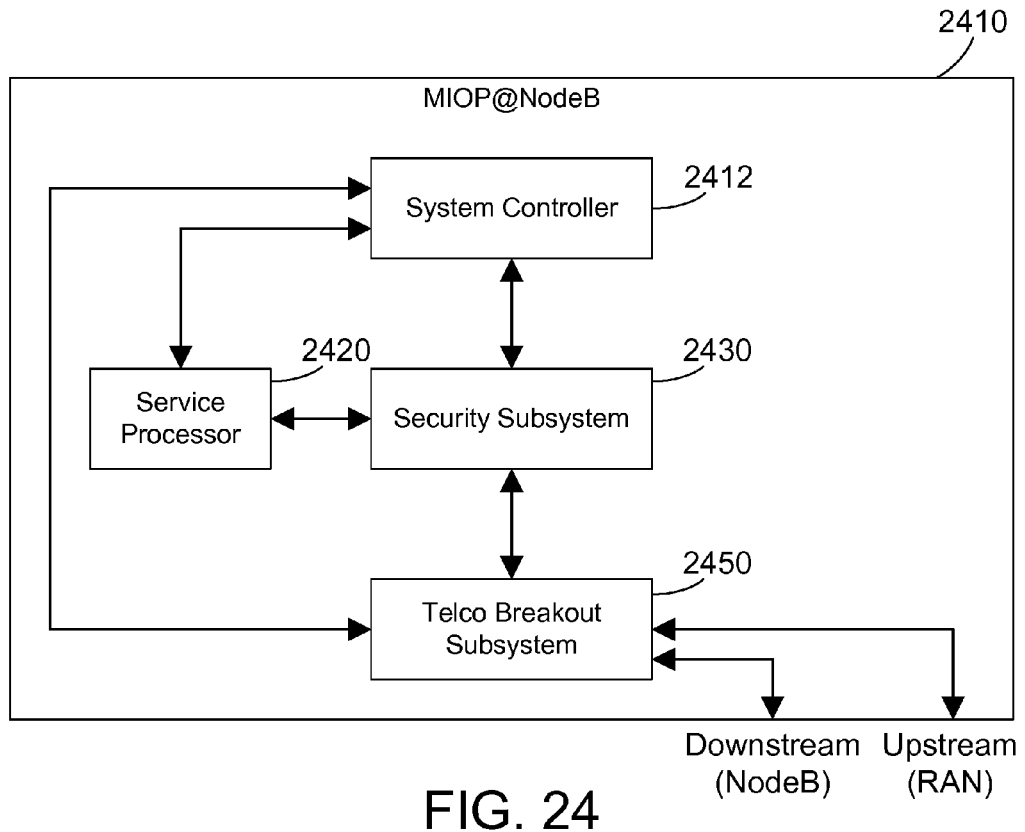
FIG. 24
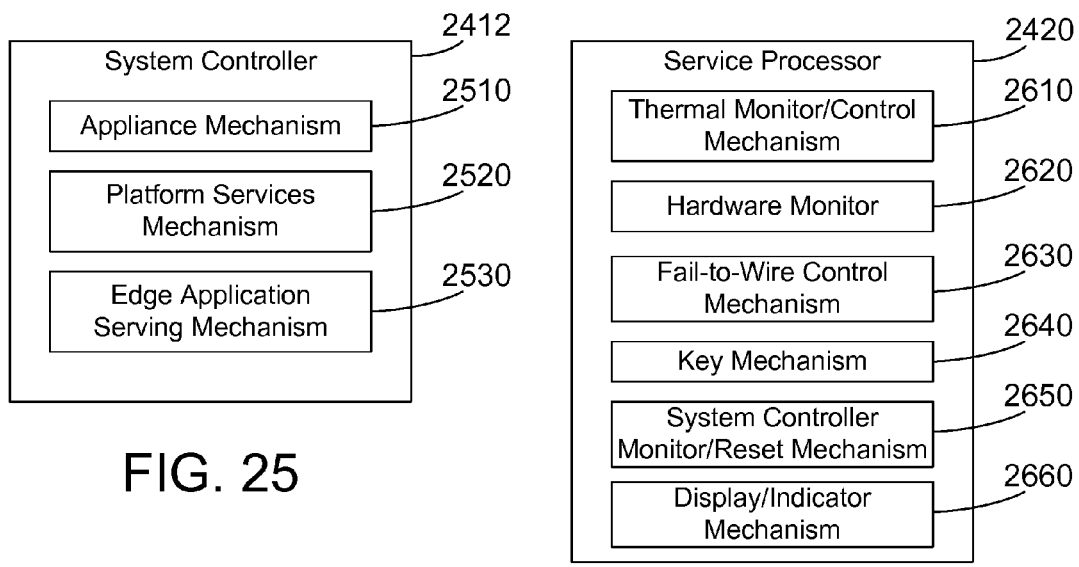
FIG. 25
FIG. 26

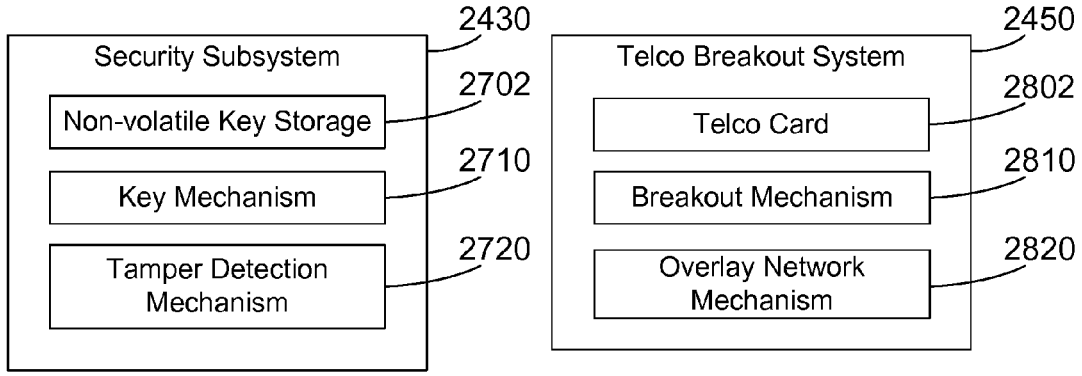
FIG. 27
FIG. 28
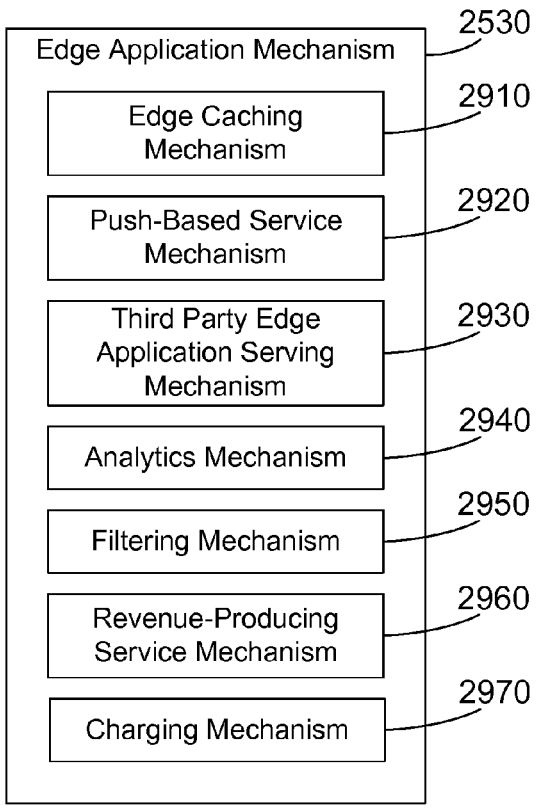
FIG. 29

| Edge Application Service | Description | Details |
|---|---|---|
| SNMP | Raise Fault Management Issues as Traps | Traps may be ignored, logged, modified and sent to MIOP@NMS, or sent unmodified to MOIP@NMS |
| NTP | Keeps Clock in KVM synchronized | Sync with local clock or NTP server in mobile data network |
| CLI | Access CLI for various operations | CLI accessible via SSH |
| Collector Service | Gather audit and diagnostic data from edge applications | Tell edge application prior to data collection, collect data via SCP, send to MIOP@NMS for further processing |
| Performance | Gather key performance indicators (KPIs) from edge applications | Use Collector Service to gather performance data, send to MIOP@NMS for further processing |
| Health/Overload | Health and overload monitoring of edge applications | Query edge application for health and overload info, or dedicated process in edge application monitors and reports health and overload info |
| Configuration | Download edge application configuration from MIOP@NMS, save/restore edge application configuration | Transfer edge application configuration between MIOP@NMS and MIOP@NodeB, and between MIOP@NodeB and edge application via SCP |
| External Communication | Allow edge application to communicate with other system(s) in mobile data network | Details of connection in image metadata or as part of configuration for edge application from MIOP@NMS |

FIG. 42

| Device-Specific Edge Application | Description |
|---|---|
| Compiler | Native compilation of applications written in Java or other language for UE |
| Power Manager | User-configured option on UE causes lower quality video to run or disables certain applications or application types on the UE to save battery power |
| Movie Editor | Performs edits of movie files on UE |
| Facial Recognition | Performs facial recognition on digital photographs on UE |
| Special Offers | Offers targeted to device type (book deals for e-Readers, music for a particular smart phone, movies for a particular tablet computer, etc.) |

FIG. 44

HOSTING DEVICE-SPECIFIC EDGE APPLICATIONS AT THE EDGE OF A MOBILE DATA NETWORK

BACKGROUND

1. Technical Field

This disclosure generally relates to mobile data systems, and more specifically relates to breakout out of data at the edge of a mobile data network in a way that is transparent to existing equipment in the mobile data network so one or more mobile network services may be performed by device-specific edge applications at the edge of the mobile data network in response to the broken-out data.

2. Background Art

Mobile phones have evolved into "smart phones" that allow a user not only to make a call, but also to access data, such as e-mails, the internet, etc. Mobile phone networks have evolved as well to provide the data services that new mobile devices require. For example, 3G networks cover most of the United States, and allow users high-speed wireless data access on their mobile devices. In addition, phones are not the only devices that can access mobile data networks. Many mobile phone companies provide equipment and services that allow a subscriber to plug a mobile access card into a Universal Serial Bus (USB) port on a laptop computer, and provide wireless internet to the laptop computer through the mobile data network. In addition, some newer mobile phones allow the mobile phone to function as a wireless hotspot, which supports connecting several laptop computers or other wireless devices to the mobile phone, which in turn provides data services via the mobile data network. As time marches on, the amount of data served on mobile data networks will continue to rise exponentially.

Mobile data networks include very expensive hardware and software, so upgrading the capability of existing networks is not an easy thing to do. It is not economically feasible for a mobile network provider to simply replace all older equipment with new equipment due to the expense of replacing the equipment. For example, the next generation wireless network in the United States is the 4G network. Many mobile data network providers are still struggling to get their entire system upgraded to provide 3G data services. Immediately upgrading to 4G equipment is not an economically viable option for most mobile data network providers. In many locations, portions of the mobile data network are connected together by point to point microwave links. These microwave links have limited bandwidth. To significantly boost the throughput of this links requires the microwave links to be replaced with fiber optic cable but this option is very costly.

BRIEF SUMMARY

Mobile network services are performed in a mobile data network in a way that is transparent to most of the existing equipment in the mobile data network. The mobile data network includes a radio access network and a core network. A breakout component in the radio access network breaks out data coming from a basestation, and hosts device-specific edge applications that perform one or more mobile network services at the edge of the mobile data network based on the broken out data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 1 is a block diagram of a prior art mobile data network;

FIG. 2 is a block diagram of a mobile data network that includes first, second and third service mechanisms that all communicate via an overlay network;

FIG. 4 is a block diagram of the MIOP@NodeB shown in FIG. 2, which includes a first service mechanism;

FIG. 5 is a block diagram of the MIOP@RNC shown in FIG. 2, which includes a second service mechanism;

FIG. 6 is a block diagram of the MIOP@Core shown in FIG. 2, which includes a third service mechanism;

FIG. 7 is a block diagram of a management mechanism coupled to the overlay network that manages the functions of MIOP@NodeB, MIOP@RNC, and MIOP@Core;

FIG. 24 is a block diagram of one specific hardware architecture for MIOP@NodeB;

FIG. 25 is a block diagram of the system controller shown in FIG. 24;

FIG. 26 is a block diagram of the service processor shown in FIG. 24;

FIG. 27 is a block diagram of the security subsystem shown in FIG. 24;

FIG. 28 is a block diagram of the telco breakout system shown in FIG. 24;

FIG. 29 is a block diagram of the edge application mechanism 2530 shown in FIG. 25 that performs multiple services at the edge of a mobile data network based on data broken out at the edge of the mobile data network;

FIG. 42 is a block diagram of a table of sample edge application services that could be called by an edge application;

FIG. 44 is a table showing examples of different types of device-specific edge applications;

DETAILED DESCRIPTION

Figure 3:
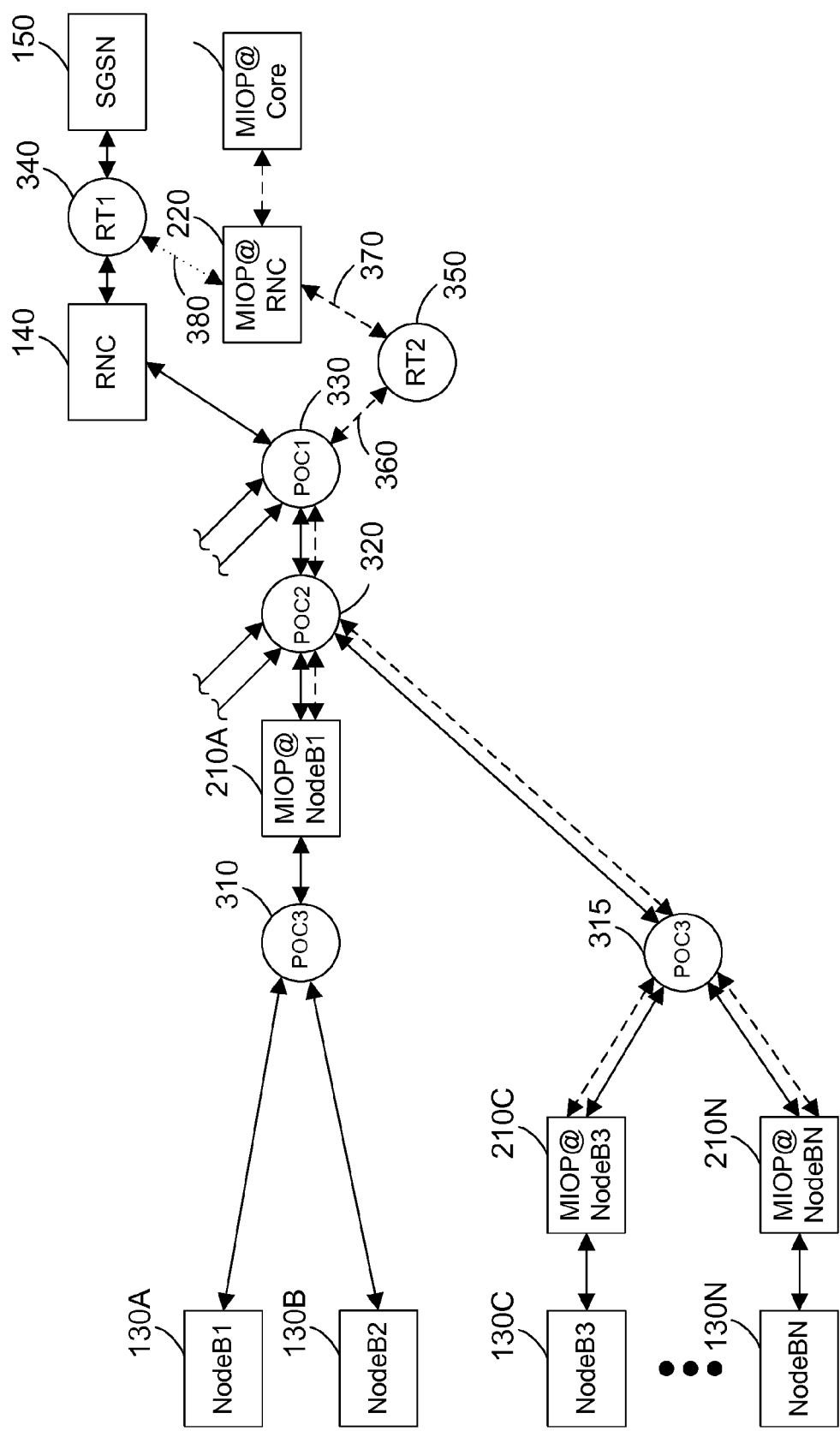
FIG. 3 is a block diagram of one possible implementation for parts of the mobile data network shown in FIG. 2 to illustrate the overlay network.

The claims and disclosure herein provide mechanisms and methods for a breakout component in a radio access network to break out data coming from a basestation, and to host device-specific edge applications that perform one or more mobile network services at the edge of the mobile data network based on the broken out data.

Referring to FIG. 1, a prior art mobile data network 100 is shown. Mobile data network 100 is representative of known 3G networks. The mobile data network 100 preferably includes a radio access network (RAN), a core network, and an external network, as shown in FIG. 1. The radio access network includes the tower 120, basestation 122 with its corresponding NodeB 130, and a radio interface on a radio network controller (RNC) 140. The core network includes a network interface on the radio network controller 140, the serving node 150, gateway node 160 and operator service network 170 (as part of the mobile data network). The external network includes any suitable network. One suitable example for an external network is the internet 180, as shown in the specific example in FIG. 1.

In mobile data network 100, user equipment 110 communicates via radio waves to a tower 120. User equipment 110 may include any device capable of connecting to a mobile data network, including a mobile phone, a tablet computer, a mobile access card coupled to a laptop computer, etc. The tower 120 communicates via network connection to a basestation 122. Each basestation 122 includes a NodeB 130, which communicates with the tower 120 and the radio network controller 140. Note there is a fan-out that is not represented in FIG. 1. Typically there are tens of thousands of towers 120. Each tower 120 typically has a corresponding base station 122 with a NodeB 130 that communicates with the tower. However, network communications with the tens of thousands of base stations 130 are performed by hundreds of radio network controllers 140. Thus, each radio network controller 140 can service many NodeBs 130 in basestations 122. There may also be other items in the network between the basestation 130 and the radio network controller 140 that are not shown in FIG. 1, such as concentrators (points of concentration) or RAN aggregators that support communications with many basestations.

The radio network controller 140 communicates with the serving node 150. In a typical 3G network, the serving node 150 is an SGSN, which is short for Service GPRS Support Node, where GPRS stands for general packet radio service. The serving node 150 mediates access to network resources on behalf of mobile subscribers and implements the packet scheduling policy between different classes of quality of service. It is also responsible for establishing the Packet Data Protocol (PDP) context with the gateway node 160 for a given subscriber session. The serving node 150 is responsible for the delivery of data packets from and to the basestations within its geographical service area. The tasks of the serving node 150 include packet routing and transfer, mobility management (attach/detach and location management), logical link management, and authentication and charging functions. The serving node 150 stores location information and user profiles of all subscribers registered with the serving node 150. Functions the serving node 150 typically performs include GPRS tunneling protocol (GTP) tunneling of packets, performing mobility management as user equipment moves from one basestation to the next, and billing user data.

In a typical 3G network, the gateway node 160 is a GGSN, which is short for gateway GPRS support node. The gateway node 160 is responsible for the interworking between the core network and external networks. From the viewpoint of the external networks 180, gateway node 160 is a router to a sub-network, because the gateway node 160 "hides" the core network infrastructure from the external network. When the gateway node 160 receives data from an external network (such as internet 180) addressed to a specific subscriber, it forwards the data to the serving node 150 serving the subscriber. For inactive subscribers paging is initiated. The gateway node 160 also handles routing packets originated from the user equipment 110 to the appropriate external network. As anchor point the gateway node 160 supports the mobility of the user equipment 110. In essence, the gateway node 160 maintains routing necessary to tunnel the network packets to the serving node 150 that services a particular user equipment 110.

The gateway node 160 converts the packets coming from the serving node 150 into the appropriate packet data protocol (PDP) format (e.g., IP or X.25) and sends them out on the corresponding external network. In the other direction, PDP addresses of incoming data packets from the external network 180 are converted to the address of the subscriber's user equipment 110. The readdressed packets are sent to the responsible serving node 150. For this purpose, the gateway node 160 stores the current serving node address of the subscriber and his or her profile. The gateway node 160 is responsible for IP address assignment and is the default router for the subscriber's user equipment 110. The gateway node 160 also performs authentication, charging and subscriber policy functions. One example of a subscriber policy function is "fair use" bandwidth limiting and blocking of particular traffic types such as peer to peer traffic. Another example of a subscriber policy function is degradation to a 2G service level for a prepaid subscriber when the prepaid balance is zero.

A next hop router located in the operator service network (OSN) 170 receives messages from the gateway node 160, and routes the traffic either to the operator service network 170 or via an internet service provider (ISP) towards the internet 180. The operator service network 170 typically includes business logic that determines how the subscriber can use the mobile data network 100. The business logic that provides services to subscribers may be referred to as a "walled garden", which refers to a closed or exclusive set of services provided for subscribers, including a carrier's control over applications, content and media on user equipment.

Devices using mobile data networks often need to access an external network, such as the internet 180. As shown in FIG. 1, when a subscriber enters a request for data from the internet, that request is passed from the user equipment 110 to tower 120, to NodeB 130 in basestation 122, to radio network controller 140, to serving node 150, to gateway node 160, to operator service network 170, and to internet 180. When the requested data is delivered, the data traverses the entire network from the internet 180 to the user equipment 110. The capabilities of known mobile data networks 100 are taxed by the ever-increasing volume of data being exchanged between user equipment 110 and the internet 180 because all data between the two have to traverse the entire network.

Some efforts have been made to offload internet traffic to reduce the backhaul on the mobile data network. For example, some mobile data networks include a node called a HomeNodeB that is part of the radio access network. Many homes have access to high-speed Internet, such as Direct Subscriber Line (DSL), cable television, wireless, etc. For example, in a home with a DSL connection, the HomeNodeB takes advantage of the DSL connection by routing Internet traffic to and from the user equipment directly to the DSL connection, instead of routing the Internet traffic through the mobile data network. While this may be an effective way to offload Internet traffic to reduce backhaul, the HomeNodeB architecture makes it difficult to provide many mobile network services such as lawful interception, mobility, and charging consistently with the 3G or 4G mobile data network.

Referring to FIG. 2, a mobile data network 200 includes mechanisms that provide various services for the mobile data network in a way that is transparent to most of the existing equipment in the mobile data network. FIG. 2 shows user equipment 110, tower 120, NodeB 130, radio network controller 140, serving node 150, gateway node 160, operator service node 170, and internet 180, the same as shown in FIG. 1. The additions to the mobile data network 200 when compared with the prior art mobile data network 100 in FIG. 1 include the addition of three components that may provide mobile network services in the mobile data network, along with a network management mechanism to manage the three components. The mobile network services are performed by what is called herein a Mobile Internet Optimization Platform (MIOP), and the mobile network services performed by the Mobile Internet Optimization Platform are referred to herein as MIOP services. The three MIOP components that provide these mobile network services are shown in FIG. 2 as MIOP@NodeB 210, MIOP@RNC 220 and MIOP@Core 230. A network management system shown as MIOP@NMS 240 manages the overall solution by: 1) managing the function of the three MIOP components 210, 220 and 230; 2) determining which MIOP@NodeBs in the system aggregate to which MIOP@RNCs via the overlay network for performance, fault and configuration management; and 3) monitoring performance of the MIOP@NodeBs to dynamically change and configure the mobile network services. The MIOP@NodeB 210, MIOP@RNC 220, MIOP@Core 230, MIOP@NMS 240, and the overlay network 250, and any subset of these, and are referred to herein as MIOP components.

The mobile network services provided by MIOP@NodeB 210, MIOP@RNC 220, and MIOP@Core 230 include any suitable services on the mobile data network, such as data optimizations, RAN-aware services, subscriber-aware services, edge-based application serving, edge-based analytics, etc. All mobile network services performed by all of MIOP@NodeB 210, MIOP@RNC 220, and MIOP@Core 230 are included in the term MIOP services as used herein. In addition to the services being offer in the MIOP components MIOP@NodeB 210, MIOP@RNC 220, and MIOP@Core 230, the various MIOP services could also be provided in a cloud based manner.

MIOP@NodeB 210 includes a first service mechanism and is referred to as the "edge" based portion of the MIOP solution. MIOP@NodeB 210 resides in the radio access network and has the ability to intercept all traffic to and from the NodeB 130. MIOP@NodeB 210 preferably resides in the base station 222 shown by the dotted box in FIG. 2. Thus, all data to and from the NodeB 130 to and from the radio network controller 140 is routed through MIOP@NodeB 210. MIOP@NodeB performs what is referred to herein as breakout of data on the intercepted data stream. MIOP@ NodeB monitors the signaling traffic between NodeB and RNC and on connection setup intercepts in particular the setup of the transport layer (allocation of the UDP Port, IP address or AAL2 channel). For registered sessions the breakout mechanism 410 will be configured in a way that all traffic belonging to this UDP Port, IP address to AAL2 channel will be forwarded to an data offload function. MIOP@NodeB 210 thus performs breakout of data by defining a previously-existing path in the radio access network for non-broken out data, by defining a new second data path that did not previously exist in the radio access network for broken out data, identifying data received from a corresponding NodeB as data to be broken out, sending the data to be broken out on the second data path, and forwarding other data that is not broken out on the first data path. The signaling received by MIOP@NodeB 210 from NodeB 130 is forwarded to RNC 140 on the existing network connection to RNC 140, even though the data traffic is broken out. Thus, RNC 140 sees the signaling traffic and knows the subscriber session is active, but does not see the user data that is broken out by MIOP@NodeB 210. MIOP@NodeB thus performs two distinct functions depending on the monitored data packets: 1) forward the data packets to RNC 140 for signaling traffic and user data that is not broken out (including voice calls); and 2) re-route the data packets for user data that is broken out.

Once MIOP@NodeB 210 breaks out user data it can perform any suitable service based on the traffic type of the broken out data. Because the services performed by MIOP@NodeB 210 are performed in the radio access network (e.g., at the basestation 222), the MIOP@NodeB 210 can service the user equipment 110 much more quickly than can the radio network controller 140. In addition, by having a MIOP@NodeB 210 that is dedicated to a particular NodeB 130, one MIOP@NodeB only needs to service those subscribers that are currently connected via a single NodeB. The radio network controller, in contrast, which typically services dozens or even hundreds of basestations, must service all the subscribers accessing all basestations it controls from a remote location. As a result, MIOP@NodeB is in a much better position to provide services that will improve the quality of service and experience for subscribers than is the radio network controller.

Breaking out data in the radio access network by MIOP@NodeB 210 allows for many different types of services to be performed in the radio access network. These services may include optimizations that are similar to optimizations provided by known industry solutions between radio network controllers and the serving node. However, moving these optimizations to the edge of the mobile data network will not only greatly improve the quality of service for subscribers, but will also provide a foundation for applying new types of services at the edge of the mobile data network, such as terminating machine-to-machine (MTM) traffic at the edge (e.g., in the basestation), hosting applications at the edge, and performing analytics at the edge.

MIOP@RNC 220 includes a second service mechanism in mobile data network 200. MIOP@RNC 220 monitors all communication between the radio network controller 140 and serving node 150. The monitored communications are all communications to and from the radio network controller and the rest of the core network. MIOP@RNC 220 may provide one or more services for the mobile data network. MIOP@RNC 220 preferably makes the decision of whether or not to allow breakout of data. If MIOP@RNC 220 decides to breakout data for a given subscriber session, it may send a message to MIOP@NodeB 210 authorizing breakout by MIOP@NodeB 210, or may decide to breakout the data at MIOP@RNC 220, depending on the configured breakout decision criteria and selected radio channel. Because messages to and from the core network establishing the PDP context for a given subscriber session are monitored by MIOP@RNC 220, the decision of whether or not to breakout data resides in the MIOP@RNC 220.

MIOP@Core 230 includes a third service mechanism in the mobile data network 200. MIOP@Core 230 may include all the same services as MIOP@RNC 220, or any suitable subset of those services. If the decision is made not to provide services at MIOP@NodeB 210 or MIOP@RNC 220, these same services plus more sophisticated services can be performed at MIOP@Core 230. Thus, mobile data network 200 provides flexibility by allowing a decision to be made of where to perform which services. Because MIOP@NodeB 210, MIOP@RNC 220 and MIOP@Core 230 preferably include some of the same services, the services between components may interact (e.g., MIOP@NodeB and MIOP@Core may interact to optimize TCP traffic between them), or the services may be distributed across the mobile data network (e.g., MIOP@NodeB performs breakout and provides services for high-speed traffic, MIOP@RNC performs breakout and provides services for low-speed traffic, and MIOP@Core provides services for non-broken out traffic). The MIOP system architecture thus provides a very powerful and flexible solution, allowing dynamic configuring and reconfiguring on the fly of which services are performed by the MIOP components and where. In addition, these services may be implemented taking advantage of existing infrastructure in a mobile data network.

MIOP@NMS 240 is a network management system that monitors and controls the functions of MIOP@NodeB 210, MIOP@RNC 220, and MIOP@Core 230. MIOP@NMS 240 preferably includes MIOP internal real-time or near real-time performance data monitoring to determine if historical or additional regional dynamic changes are needed to improve services on the mobile data network 200. MIOP@NMS 240 provides a user interface that allows a system administrator to operate and to configure how the MIOP components 210, 220 and 230 function.

The overlay network 250 allows MIOP@NodeB 210, MIOP@RNC 220, MIOP@Core 230, and MIOP@NMS 240 to communicate with each other. The overlay network 250 is preferably a virtual private network primarily on an existing physical network in the mobile data network. Thus, while overlay network 250 is shown in FIG. 2 separate from other physical network connections, this representation in FIG. 2 is a logical representation.

FIG. 3 shows one suitable implementation of a physical network and the overlay network in a sample mobile data system. The existing physical network in the mobile data network before the addition of the MIOP@NodeB 210, MIOP@RNC 220, and MIOP@Core 230 is shown by the solid lines with arrows. This specific example in FIG. 3 includes many NodeBs, shown in FIG. 1 as 130A, 130B, 130C, . . . , 130N. Some of the NodeBs have a corresponding MIOP@NodeB. FIG. 3 illustrates that MIOP@NodeBs (such as 210A and 210N) can be placed in a basestation with its corresponding NodeB, or can be placed upstream in the network after a point of concentration (such as 210A after POC3 310). FIG. 3 also illustrates that a single MIOP@NodeB such as MIOP@NodeB1 210A can service two different NodeBs, such as NodeB1 130A and NodeB2 130B. Part of the overlay network is shown by the dotted lines between MIOP@NodeB1 210A and second point of concentration POC2 320, between MIOP@NodeB3 210C and POC3 315, between MIOP@NodeBN 210N and POC3 315, and between POC3 315 and POC2 320. Note the overlay network in the radio access network portion is a virtual private network that is implemented on the existing physical network connections. The overlay network allows the MIOP@NodeBs 210A, 210C and 210N to communicate with each other directly, which makes some services possible in the mobile data network 200 that were previously impossible. FIG. 3 shows MIOP@NodeB1 210A connected to a second point of concentration POC2 320. The broken arrows coming in from above at POC2 320 represent connections to other NodeBs, and could also include connections to other MIOP@NodeBs. Similarly, POC2 320 is connected to a third point of concentration POC1 330, with possibly other NodeBs or MIOP@NodeBs connected to POC1. The RNC 140 is shown connected to POC1 330, and to a first router RT1 340 in the core network. The router RT1 340 is also connected to the SGSN 150. While not shown in FIG. 3 for the sake of simplicity, it is understood that SGSN in FIG. 3 is also connected to the upstream core components shown in FIG. 2, including GGSN 160, OSN 170 and internet 180.

As shown in FIG. 3, the overlay network from the NodeBs to POC1 330 is a virtual private network implemented on existing physical network connections. However, the overlay network requires a second router RT2 350, which is connected via a physical network connection 360 to POC1 330, and is connected via physical network connection 370 to MIOP@RNC 220. This second router RT2 350 may be a separate router, or may be a router implemented within MIOP@RNC 220. MIOP@RNC 220 is also connected to router RT1 340 via a physical network connection 380, and is also connected to MIOP@Core 230. Physical connection 380 in FIG. 3 is shown in a line with short dots because it is not part of the pre-existing physical network before adding the MIOP components (arrows with solid lines) and is not part of the overlay network (arrows with long dots). Note the connection from MIOP@RNC 220 to MIOP@Core 230 is via existing physical networks in the core network.

We can see from the configuration of the physical network and overlay network in FIG. 3 that minimal changes are needed to the existing mobile data network to install the MIOP components. The most that must be added is one new router 350 and three new physical network connections 360, 370 and 380. Once the new router 350 and new physical network connections 360, 370 and 380 are installed, the router 350 and MIOP components are appropriately configured, and the existing equipment in the mobile data network is configured to support the overlay network, the operation of the MIOP components is completely transparent to existing network equipment.

As can be seen in FIG. 3, data on the overlay network is defined on existing physical networks from the NodeBs to POC1. From POC1 the overlay network is on connection 360 to RT2 350, and on connection 370 to MIOP@RNC 220. Thus, when MIOP@NodeB 210 in FIG. 2 needs to send a message to MIOP@RNC 220, the message is sent by sending packets via a virtual private network on the physical network connections to POC1, then to RT2 350, then to MIOP@RNC 220. Virtual private networks are well-known in the art, so they are not discussed in more detail here.

Referring to FIG. 4, MIOP@NodeB 210 preferably includes a breakout mechanism 410, an edge service mechanism 430, and an overlay network mechanism 440. The breakout mechanism 410 determines breakout preconditions 420 that, when satisfied, allow breakout to occur at this edge location. Breakout mechanism 410 in MIOP@NodeB 210 communicates with the breakout mechanism 510 in MIOP@RNC 220 shown in FIG. 5 to reach a breakout decision. The breakout mechanism 410, after receiving a message from MIOP@RNC 220 authorizing breakout on connection setup intercepts in particular the setup of the transport layer (allocation of the UDP Port, IP address or AAL2 channel). For authorized sessions the breakout mechanism 410 will be configured in a way that all traffic belonging to this UDP Port, IP address or AAL2 channel will be forwarded to a data offload function. For traffic that should not be broken out, the breakout mechanism 410 sends the data on the original data path in the radio access network. In essence, MIOP@NodeB 210 intercepts all communications to and from the basestation 130, and can perform services "at the edge", meaning at the edge of the radio access network that is close to the user equipment 110. By performing services at the edge, the services to subscribers may be increased or optimizes without requiring hardware changes to existing equipment in the mobile data network.

The breakout mechanism 410 preferably includes breakout preconditions 420 that specify one or more criterion that must be satisfied before breakout of data is allowed. One suitable example of breakout preconditions is the speed of the channel. In one possible implementation, only high-speed channels will be broken out at MIOP@NodeB 210. Thus, breakout preconditions 420 could specify that subscribers on high-speed channels may be broken out, while subscribers on low-speed channels are not broken out at MIOP@NodeB 210. When the breakout preconditions 420 are satisfied, the MIOP@NodeB 210 registers the subscriber session with MIOP@RNC 220. This is shown in method 800 in FIG. 8. MIOP@NodeB 210 intercepts and monitors network traffic to and from NodeB (basestation) (step 810). When the traffic does not satisfy the breakout preconditions (step 820=NO), method 800 returns to step 810. When the traffic satisfies the breakout conditions (step 820=YES), MIOP@NodeB 210 sends a message to MIOP@RNC 220 on the overlay network 250 to register the subscriber session for breakout (step 830). With the subscriber session registered with MIOP@RNC 220, the MIOP@RNC 220 will determine whether or not to breakout data for the subscriber session, and where the breakout is done, as explained in more detail below.

Referring back to FIG. 4, MIOP@NodeB 210 also includes an edge service mechanism 430. The edge service mechanism 430 provides one or more services for the mobile data network 200. The edge service mechanism 430 may include any suitable service for the mobile data network including without limitation caching of data, data or video compression techniques, push-based services, charging, application serving, analytics, security, data filtering, new revenue-producing services, etc. The edge service mechanism is the first of three service mechanisms in the MIOP components. While the breakout mechanism 410 and edge service mechanism 430 are shown as separate entities in FIG. 4, the first service mechanism could include both breakout mechanism 410 and edge service mechanism 430.

MIOP@NodeB 210 also includes an overlay network mechanism 440. The overlay network mechanism 440 provides a connection to the overlay network 250 in FIG. 2, thereby allowing MIOP@NodeB 210 to communicate with MIOP@RNC 220, MIOP@Core 230, and MIOP@NMS 240. As stated above, the overlay network 250 is preferably a virtual private network primarily on an existing physical network in the mobile data network 200.

Figure 8:
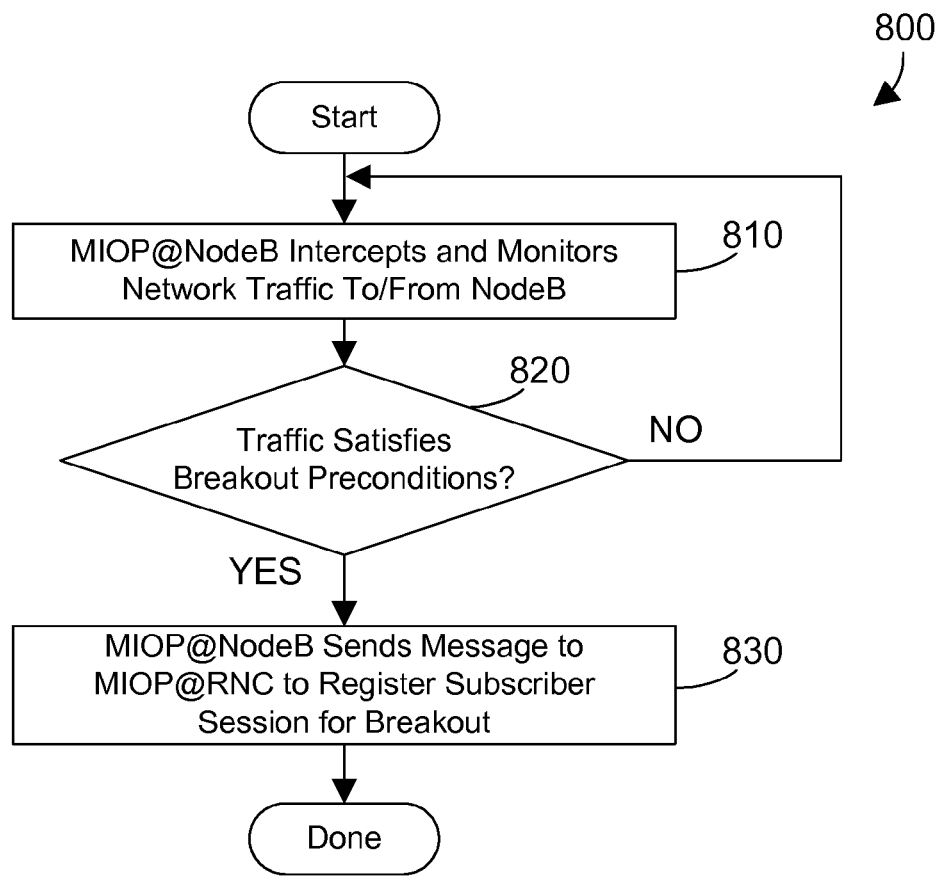
FIG. 8 is a flow diagram of a method performed by MIOP@NodeB shown in FIGS. 2 and 4.

Referring to FIG. 5, MIOP@RNC 220 preferably includes a breakout mechanism 510, an RNC service mechanism 540, an overlay network mechanism 550, and business intelligence 560. Breakout mechanism 510 includes breakout criteria 520 that specifies one or more criterion that, when satisfied, allows breakout of data. Subscriber registration mechanism 530 receives messages from MIOP@NodeB 210, and registers subscriber sessions for which the breakout preconditions 420 in MIOP@NodeB 210 are satisfied. When the breakout mechanism 510 determines the breakout criteria 520 is satisfied, the breakout mechanism 510 will then determine where the breakout should occur. When the breakout can occur at MIOP@NodeB 210, the MIOP@RNC 220 sends a message to MIOP@NodeB 210 on the overlay network 250 authorizing breakout at MIOP@NodeB 210. When the breakout should occur at MIOP@RNC 220, the breakout mechanism 510 in MIOP@RNC 220 performs the breakout as well for the traffic remaining then). This is shown in more detail in method 1000 in FIG. 10. MIOP@RNC monitors network traffic between the radio network controller 140 and the serving node 150 (step 1010). When the traffic does not satisfy the breakout criteria (step 1020=NO), method 1000 loops back to step 1010. When the network traffic satisfies the breakout criteria (step 1020=YES), the breakout mechanism 510 determines whether the subscriber session is registered for breakout (step 1030). A subscriber session is registered for breakout when the MIOP@NodeB 210 determined the traffic satisfied the breakout preconditions and registered the subscriber session for breakout, as shown in FIG. 8. Returning to FIG. 10, when the subscriber is registered for breakout (step 1030=YES), MIOP@RNC 220 sends a message via the overlay network 250 to MIOP@NodeB 210 authorizing breakout of traffic for the subscriber session (step 1040). MIOP@NodeB 210 may then breakout traffic for the subscriber session (step 1050). When the subscriber is not registered for breakout (step 1030=NO), method 1000 checks to see if MIOP@RNC is going to do breakout (step 1060). If not (step 1060=NO), method 1000 is done. When MIOP@RNC is going to do breakout (step 1060=YES), the traffic is then broken out at MIOP@RNC (step 1070).

Figure 10:
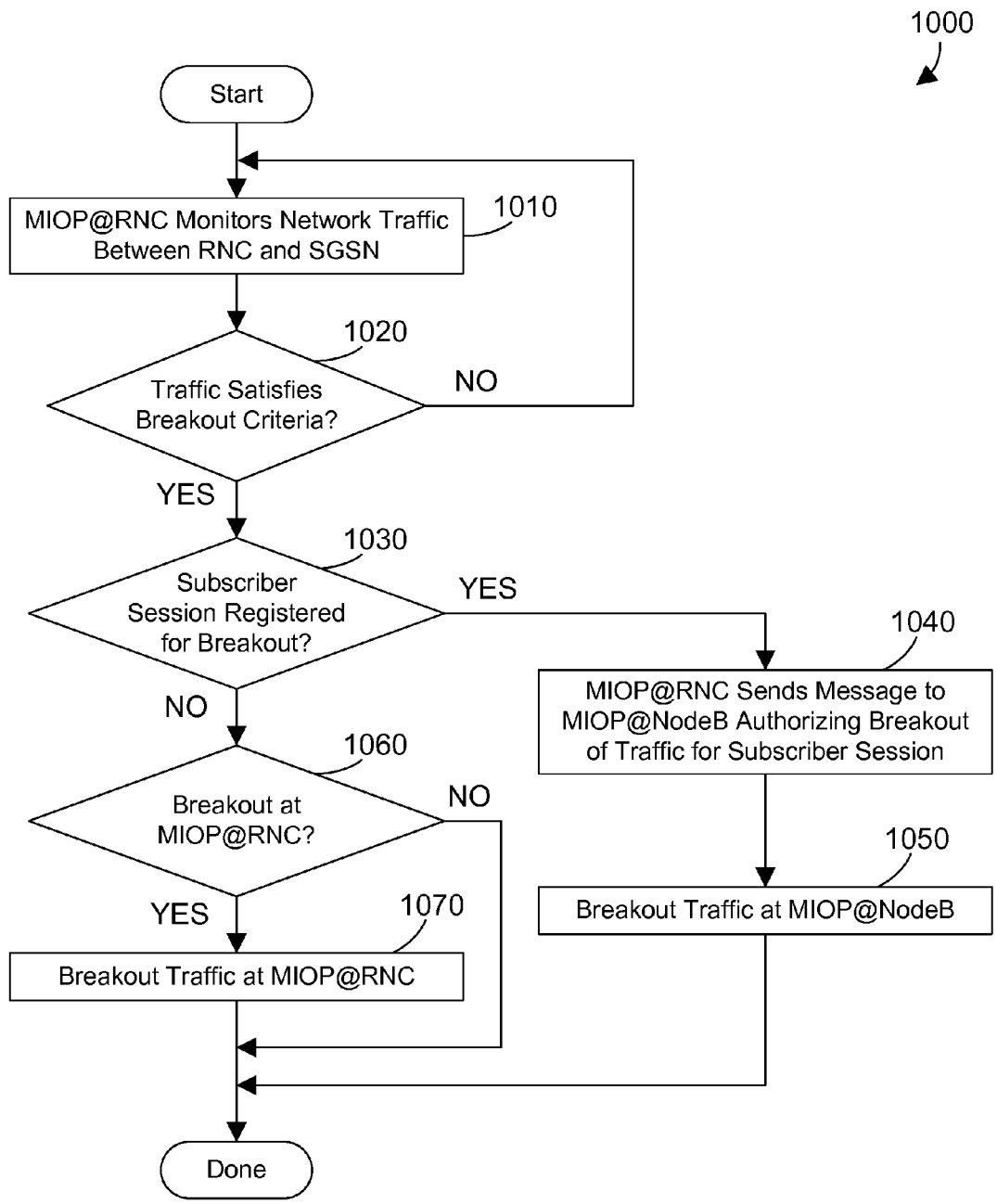
FIG. 10 is a flow diagram of a method for the MIOP@NodeB and MIOP@RNC to determine when to break out data.

In one specific example, the breakout preconditions specify only high-speed channels are broken out at MIOP@NodeB 210, and when the breakout preconditions are satisfied, the subscriber session is registered for breakout, as shown in FIG. 8. FIG. 10 illustrates that even when the breakout preconditions are not satisfied, breakout can still be performed at MIOP@RNC 220. Thus, even if the subscriber session is on a low-speed channel, if all the other breakout criteria are satisfied, breakout of the low-speed channel may be performed at MIOP@RNC 220. The mobile data network 200 thus provides great flexibility in determining when to do breakout and where.

Referring back to FIG. 5, the RNC service mechanism 540 provides one or more services for the mobile data network. RNC service mechanism 540 is the second of three service mechanisms in the MIOP components. The RNC service mechanism 540 may include any suitable service for the mobile data network, including without limitation caching of data, data or video compression techniques, push-based services, charging, application serving, analytics, security, data filtering, new revenue-producing services, etc.

While the breakout mechanism 510 and RNC service mechanism 540 are shown as separate entities in FIG. 5, the second service mechanism could include both breakout mechanism 510 and RNC service mechanism 540. The overlay network mechanism 550 is similar to the overlay network mechanism 440 in FIG. 4, providing a logical network connection to the other MIOP components on the overlay network 250 in FIG. 2. MIOP@RNC 220 also includes business intelligence 560, which includes:
1) historical subscriber information received from the mobile data network over time, such as mobility and location, volumes, traffic types, equipment used, etc.
2) network awareness, including NodeB load states, service area code, channel type, number of times channel type switching occurred for a PDP session, serving cell ID, how many cells and their IDs are in the active set, PDP context type, PDP sessions per subscriber, session duration, data consumption, list of Uniform Resource Locators (URLs) browsed for user classification, top URL browsed, first time or repeat user, entry point/referral URLs for a given site, session tracking, etc.
3) association of flow control procedures between NodeB and RNC to subscribers.

The business intelligence 560 may be instrumented by the RNC service mechanism 540 to determine when and what types of MIOP services to perform for a given subscriber. For example, services for a subscriber on a mobile phone may differ when compared to services for a subscriber using a laptop computer to access the mobile data network. In another example, voice over internet protocol (VOIP) session could have the data broken out.

Referring to FIG. 6, the MIOP@Core 230 includes a core service mechanism 610 and an overlay network mechanism 620. Core service mechanism 610 provides one or more services for the mobile data network. Core service mechanism 610 is the third of three service mechanisms in the MIOP components. The core service mechanism 610 may include any suitable service for the mobile data network, including without limitation caching of data, data or video compression techniques, push-based services, charging, application serving, analytics, security, data filtering, new revenue-producing services, etc. In one specific implementation, the MIOP@Core 230 is an optional component, because all needed services could be performed at MIOP@NodeB 210 and MIOP@RNC 220. In an alternative implementation, MIOP@Core 230 performs some services, while MIOP@RNC performs others or none. The overlay network mechanism 620 is similar to the overlay network mechanisms 440 in FIGS. 4 and 550 in FIG. 5, providing a logical network connection to the other MIOP components on the overlay network 250 in FIG. 2.

Referring to FIG. 7, the MIOP@NMS 240 is a network management system that monitors and manages performance of the mobile data network 200, and controls the function of MIOP@NodeB 210, MIOP@RNC 220, and MIOP@Core 230. MIOP@NMS 240 preferably includes a network monitoring mechanism 710, a performance management mechanism 720, a security management mechanism 730, and a configuration management mechanism 740. The network monitoring mechanism 710 monitors network conditions, such as alarms, in the mobile data network 200. The performance management mechanism 720 can enable, disable or refine certain services by supporting the execution of services in real-time or near real-time, such as services that gather information to assess customer satisfaction. The security management mechanism 730 manages security issues in the mobile data network, such as intrusion detection or additional data privacy. The configuration management mechanism 740 controls and manages the configuration of MIOP@NodeB 210, MIOP@RNC 220, and MIOP@Core 230 in a way that allows them to dynamically adapt to any suitable criteria, including data received from the network monitoring mechanism, time of day, information received from business intelligence 560, etc.

Figure 9:
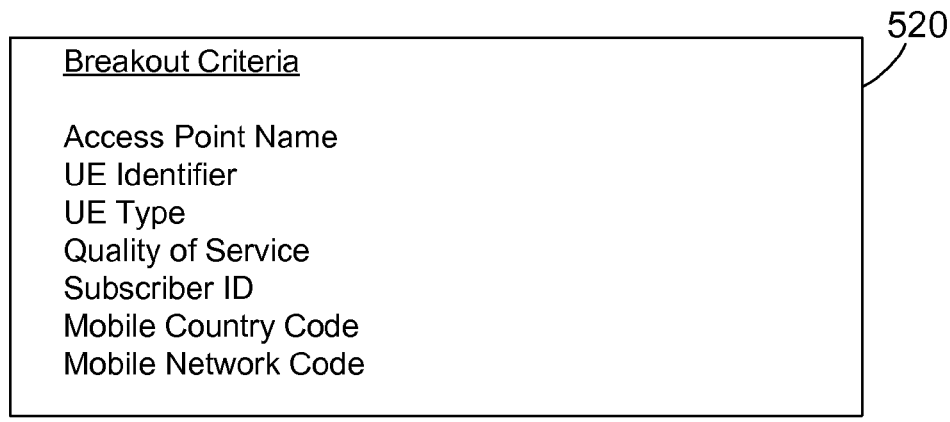
FIG. 9 is a block diagram showing breakout criteria MIOP@RNC may use in making a decision of whether or not to break out data.
Figure 11:
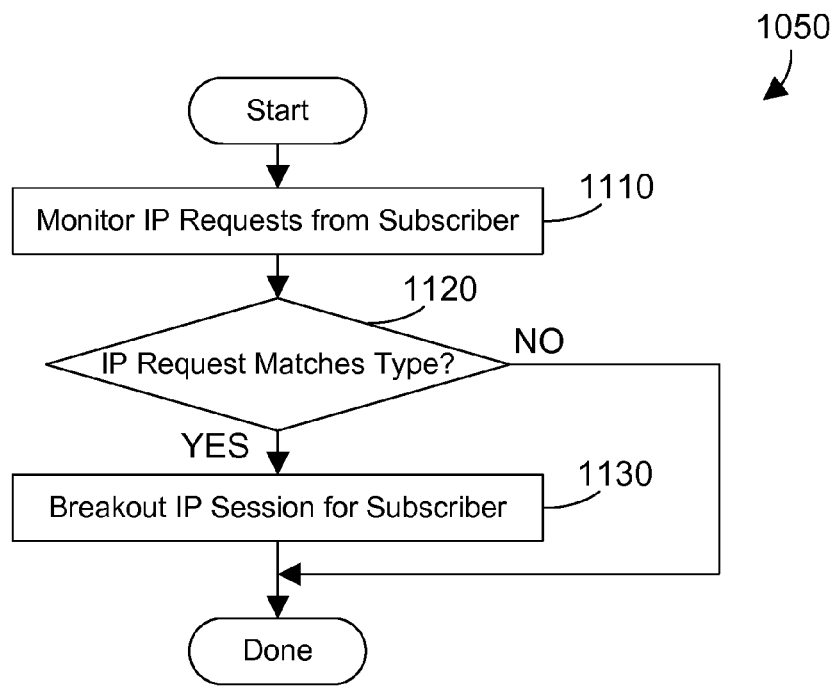
FIG. 11 is a flow diagram of a method for the first service mechanism in MIOP@NodeB to selectively break out data when break out for a specified subscriber session has been authorized.

FIG. 9 shows sample breakout criteria 520 shown in FIG. 5 and used in step 1020 in FIG. 10. Suitable breakout criteria 520 includes access point name, user equipment identifier, user equipment type, quality of service, subscriber ID, mobile country code, and mobile network code. For example, breakout criteria 520 could specify to perform MIOP services for the operator's subscribers, and not to perform MIOP services for roamers. In another example, the breakout criteria 520 could specify to break out only video requests. A static breakout decision will be performed during PDP Context Activation. Based on IP flows (e.g. shallow packet inspection of the IP 5 tuple) only specific IP flows maybe identified and broken out dynamically within that PDP subscriber session (e.g., VOIP traffic), as discussed in more detail below with respect to FIG. 11. Breakout criteria 520 expressly extends to any suitable criteria for making the breakout decision.

Referring again to FIG. 10, when the traffic satisfies the breakout criteria (step 1020=YES), and the subscriber session is registered for breakout (step 1030=YES), MIOP@RNC sends a message to MIOP@NodeB authorizing breakout of traffic for this subscriber session (step 1040). In response, MIOP@NodeB begins decrypting the bearer, examining the signaling and user IP traffic tunneled through it and may breakout the traffic for this subscriber session (step 1050). Note, however, MIOP@NodeB may still decide not to breakout all traffic based on other criteria, such as type of IP request the destination of the traffic or the ISO Layer 7 Application of the decrypted user traffic. Determination of the Application may be performed simply by inspection of the IP 5-tuple or optionally via inspection at layer 7 using Deep Packet Inspection (DPI) techniques. This is shown in the specific example in FIG. 11. Method 1050 in FIG. 10 is one suitable implementation of step 1050 in FIG. 10. MIOP@NodeB monitors IP requests from the subscriber (step 1110). When the user traffic IP request matches a specified type criteria (step 1120=YES), the IP session is broken out for the subscriber (step 1130). When the IP request does not match a specified criteria type (step 1120=NO), no breakout is performed. For example, let's assume that IP requests to access video over the RTP layer 7 Application Protocol are broken out so the video data may be cached in MIOP@NodeB 210, but other requests, such as Google searches, are not. The MIOP@NodeB monitors the IP requests from the subscriber (step 1110), and when the subscriber session IP request carries RTP traffic is for a video file (step 1120=YES), the IP session is broken out (step 1130). Otherwise, the IP session is not broken out at MIOP@NodeB. This is one simple example to illustrate additional flexibility and intelligence within MIOP@NodeB that may determine whether or not to perform breakout for a given subscriber session at the MIOP@NodeB after being authorized by MIOP@RNC to perform breakout for that subscriber session. Any suitable criteria could be used to determine what to breakout and when at MIOP@NodeB once MIOP@NodeB has been authorized for breakout in step 1040 in FIG. 10.

Figure 12:
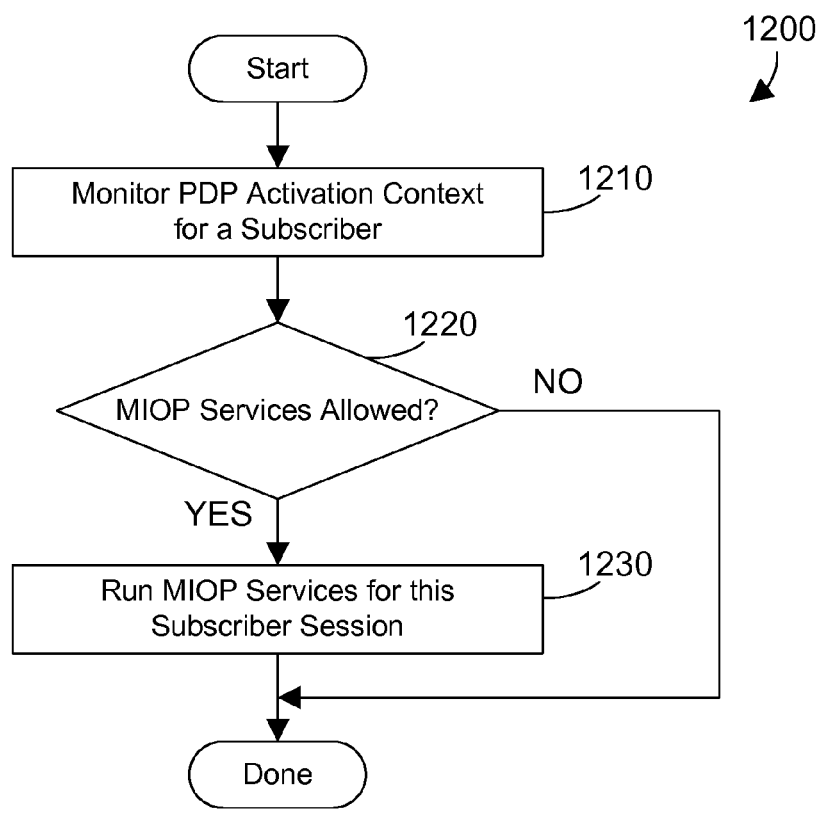
FIG. 12 is a flow diagram of a method for determining when to run MIOP services for a specified subscriber session.

Referring to FIG. 12, method 1200 shows a method for determining when to run MIOP services. The Packet Data Protocol (PDP) activation context for a subscriber is monitored (step 1210). A PDP activation context is established when user equipment 110 connects to tower 120 and the subscriber runs an application that triggers the PDP activation procedure. The core network will determine the subscriber, and perhaps corresponding user equipment. When MIOP services are allowed (step 1220=YES), services for this subscriber session are run (step 1230) upon the arrival of data from the subscriber. When MIOP services are not allowed (step 1220=NO), no MIOP services are run. In one simple example, MIOP services in the mobile data network are allowed for authorized subscribers, but are not allowed for subscribers from a different wireless company that are roaming.

Figure 13:
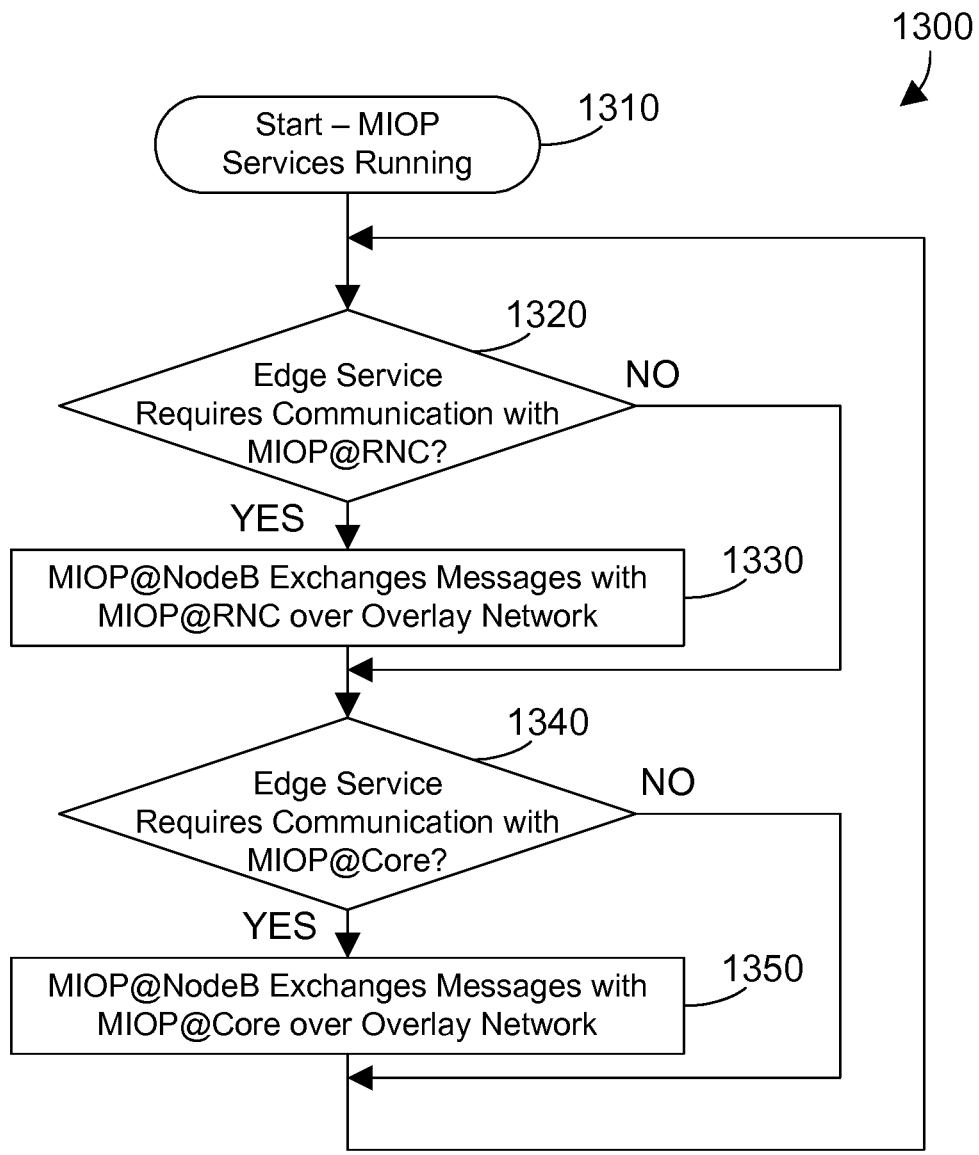
FIGS. 13-15 are flow diagrams that each show communications between MIOP components when MIOP services are running.

MIOP services may require communicating between MIOP components on the overlay network. Referring to FIG. 13, a method 1300 shows communications by MIOP@NodeB when MIOP services are running (step 1310). When the edge service mechanism requires communication with MIOP@RNC (step 1320=YES), MIOP@NodeB exchanges messages with MIOP@RNC over the overlay network (step 1330). When the edge service mechanism requires communication with MIOP@Core (step 1340=YES), MIOP@NodeB exchanges messages with MIOP@Core over the overlay network (step 1350). The overlay network thus allows the various MIOP components to communicate with each other when MIOP services are running.

Figure 14:
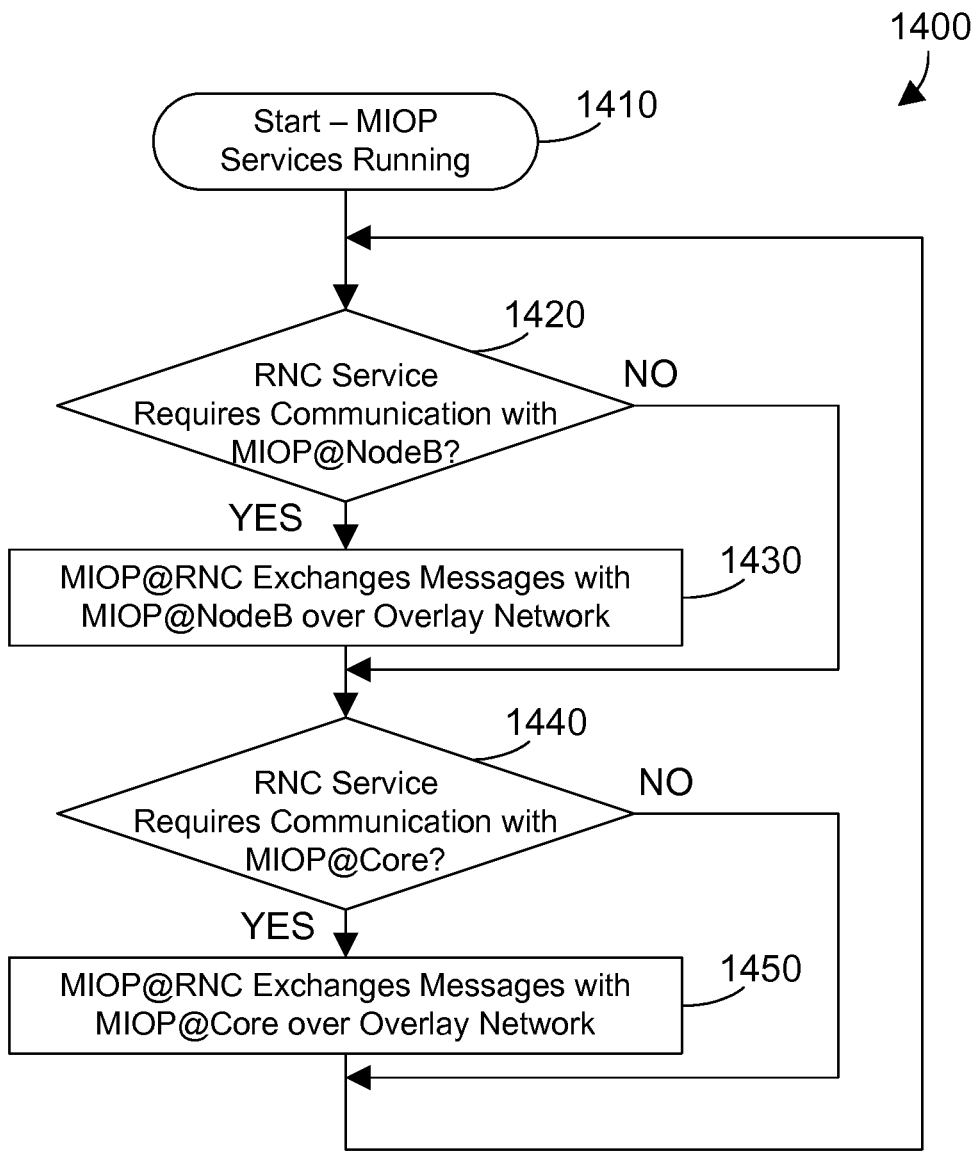

FIG. 14 shows a method 1400 that shows communications by MIOP@RNC when MIOP services are running (step 1410). When the RNC service mechanism requires communication with MIOP@NodeB (step 1420=YES), MIOP@RNC exchanges messages with MIOP@NodeB over the overlay network (step 1430). When the RNC service mechanism requires communication with MIOP@Core (step 1440=YES), MIOP@RNC exchanges messages with MIOP@Core over the overlay network (step 1450).

Figure 15:
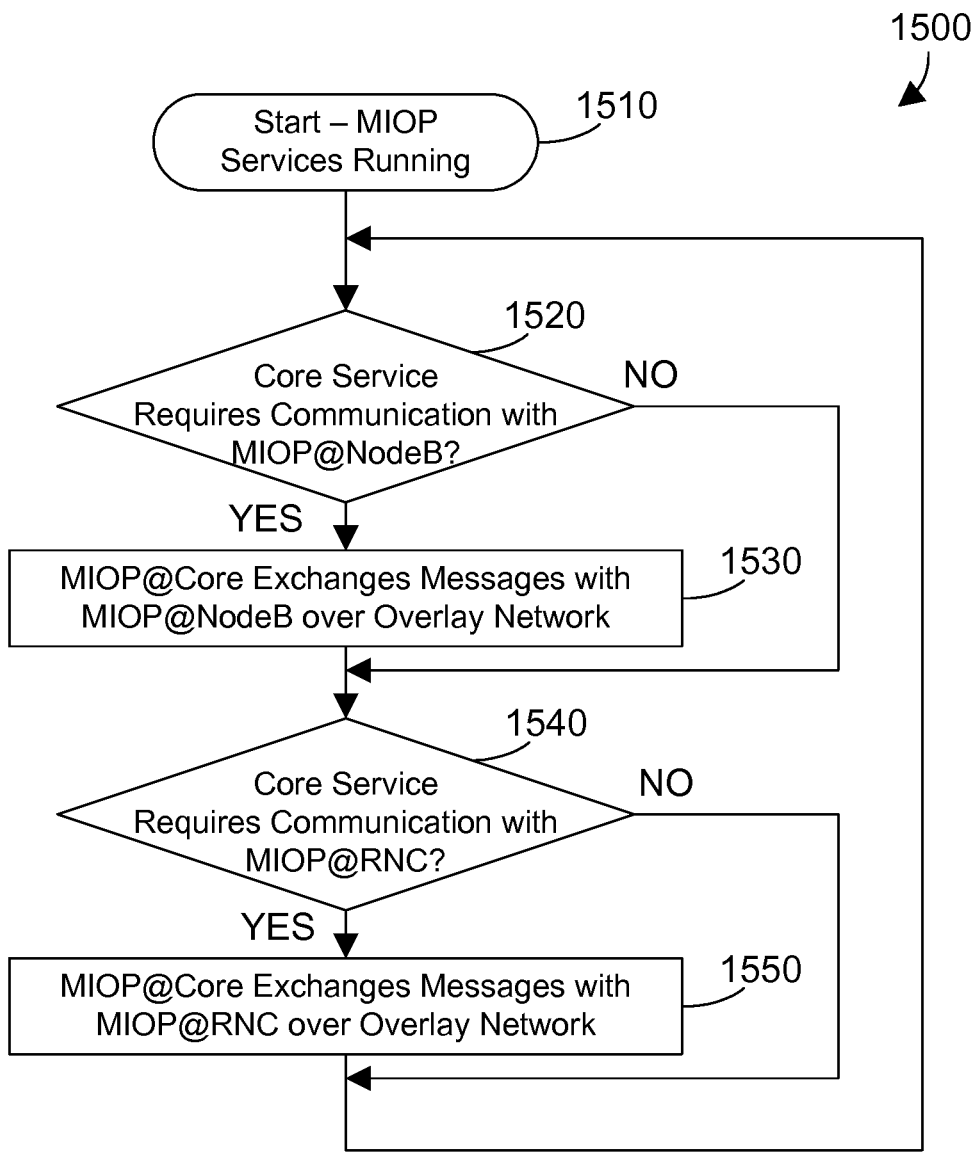

FIG. 15 shows a method 1500 that shows communications by MIOP@Core when MIOP services are running (step 1510). When the core service mechanism requires communication with MIOP@NodeB (step 1520=YES), MIOP@Core exchanges messages with MIOP@NodeB over the overlay network (step 1530) relayed via MIOP@RNC. When the core service mechanism requires communication with MIOP@RNC (step 1540=YES), MIOP@Core exchanges messages with MIOP@RNC over the overlay network (step 1550).

Figure 16:
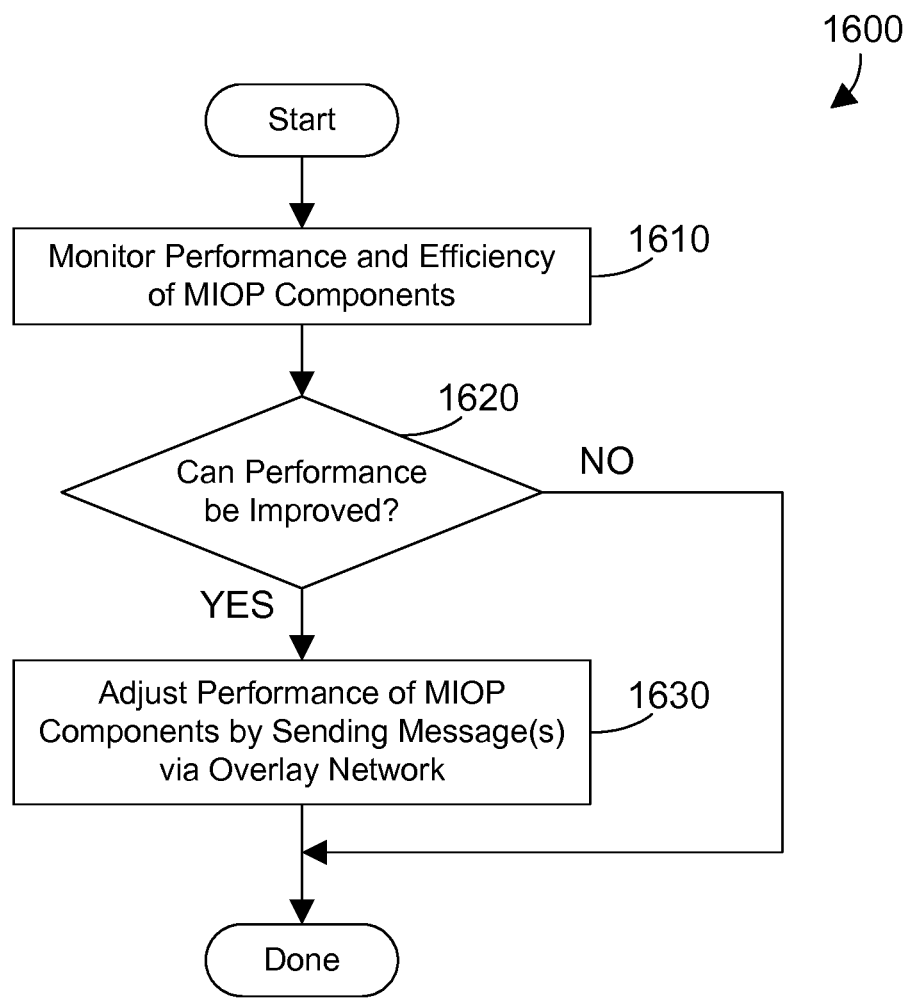
FIG. 16 is a flow diagram of a method for managing and adjusting the MIOP components.

FIG. 16 shows a method 1600 that is preferably performed by MIOP@NMS 240 in FIGS. 2 and 7. The performance and efficiency of the MIOP components that perform MIOP services are monitored (step 1610). The MIOP components that perform MIOP services may include MIOP@NodeB 210, MIOP@RNC 220, and MIOP@Core 230, assuming all of these components are present in the mobile data network 200. When performance may be improved (step 1620=YES), the performance of the MIOP components is adjusted (if implemented and applicable) by sending one or more network messages via the overlay network (step 1630). Note also a human operator could also manually reconfigure the MIOP components to be more efficient.

Figure 17:
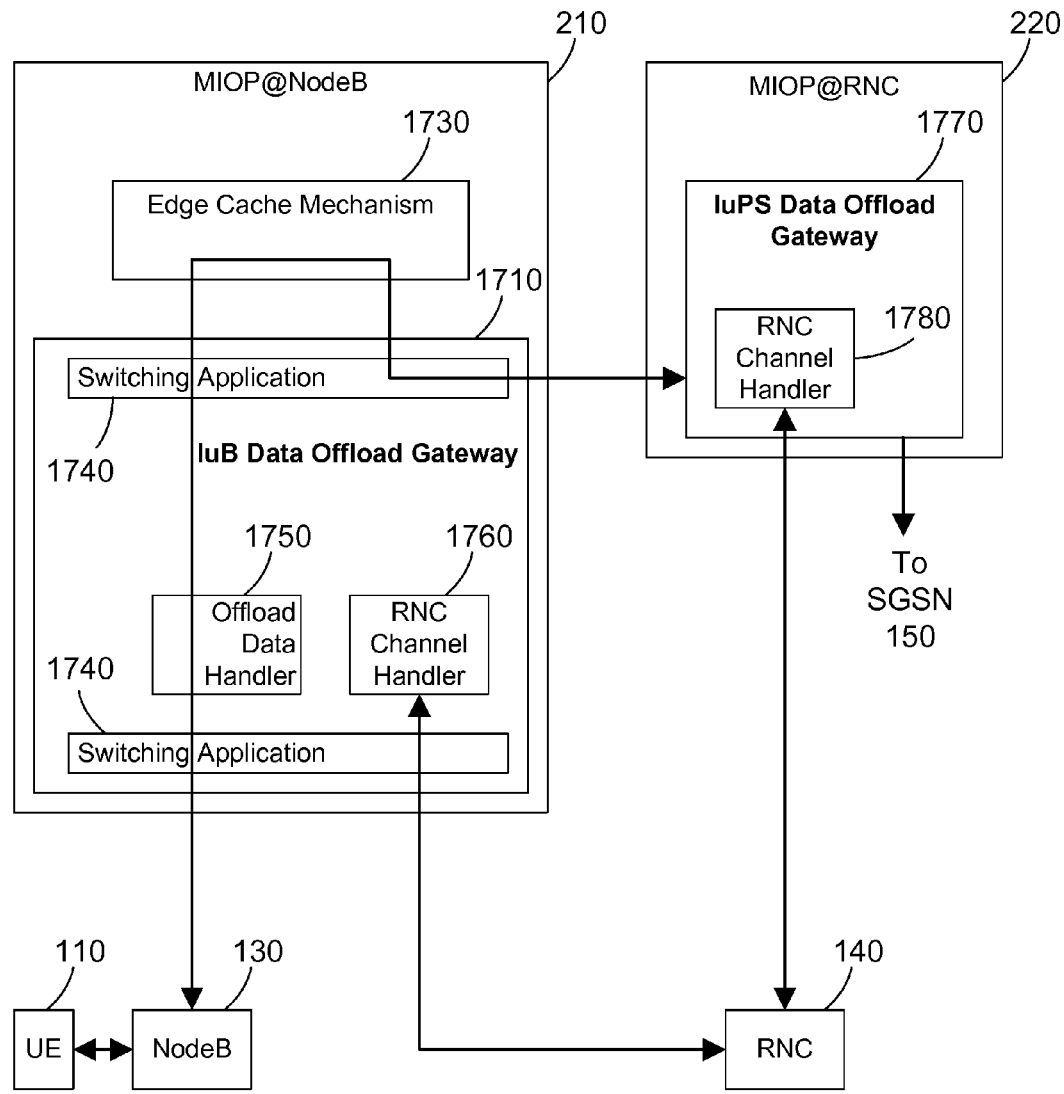
FIG. 17 is a block diagram of one specific implementation for MIOP@NodeB and MIOP@RNC.

Referring to FIG. 17, implementations for MIOP@NodeB 210 and MIOP@RNC 220 are shown by way of example. Other implementations are possible within the scope of the disclosure and claims herein. User equipment 110 is connected to NodeB 130. Note the antenna 120 shown in FIG. 2 is not shown in FIG. 17, but is understood to be present to enable the communication between user equipment 110 and NodeB 130. MIOP@NodeB 210 includes an edge cache mechanism 1730, which is one suitable example of edge service mechanism 430 in FIG. 4. MIOP@NodeB 210 includes an interface referred to herein as IuB Data Offload Gateway (IuB DOGW) 1710. This gateway 1710 implements the breakout mechanism 410 according to one or more specified breakout preconditions 420 shown in FIG. 4. IuB DOGW 1710 includes a switching application 1740, an offload data handler 1750, and an RNC channel handler 1760. The switching application 1740 is responsible for monitoring data packets received from NodeB 130, forwarding the broken out data packets to the offload data handler according to its configuration, and relaying the non-broken out data packets and control system flows to the RNC 140 via the original connections in the RAN. While switching application 1740 is shown as two separate boxes in FIG. 17, this is done to visually indicate the switching application 1740 performs switching on two different interfaces, the network interface and overlay network interface, but the switching application 1740 is preferably a single entity.

When a breakout decision is made and MIOP@RNC 220 sends a message to MIOP@NodeB 210 authorizing breakout (see step 1040 in FIG. 10), when MIOP@NodeB decides to breakout specified user data, the specified user data received by the switching application 1740 from NodeB 130 is broken out, which means the switching application 1740 routes the specified user data to the offload data handler 1750 so the broken out data is routed to the data path defined for breakout data. The offload data handler 1750 may send the data to the edge cache mechanism 1730 for processing, which can route the data directly to MIOP@RNC 220 via the overlay network, as shown by the path with arrows going from NodeB 130 to MIOP@RNC 220.

User data that is not broken out and signaling traffic is routed directly back by the switching application 1740 to RNC. In this manner, non-broken out data and signaling traffic passes through the IuB DOGW 1710 to RNC 140, while broken out data is routed by the IuB DOGW 1710 to a different destination. Note that edge cache mechanism 1730 may send messages to MIOP@RNC 220 as shown in FIG. 17, but the broken out messages themselves are not sent to MIOP@RNC 220.

MIOP@RNC 220 includes an interface referred to herein as IuPS data offload gateway (IuPS DOGW) 1770. IuPS DO GW 1770 forwards all signaling and non-broken out data traffic from RNC 140 to SGSN 150 via the GTP tunnel. IuPS DOGW 1770 includes the breakout mechanism 510, breakout criteria 520 and subscriber registration mechanism 530 shown in FIG. 5 and discussed above with reference to FIG. 5. IuPS DOGW 1770 may exchange messages with IuB DOGW 1710 via the overlay network to perform any needed service in MIOP@NodeB 210 or MIOP@RNC 220. For the specific implementation shown in FIG. 17, while the IuPS DOGW 1770 in MIOP@RNC 220 does not include an offload data handler, the IuPS DOGW 1770 could include an offload data handler and switching application similar to those shown in MIOP@NodeB 210 when MIOP@RNC 220 also needs to perform breakout of data.

The IuPS DOGW 1770 includes an RNC channel handler 1780. The RNC channel handlers 1760 in MIOP@NodeB 210 and 1780 in MIOP@RNC 220 monitor data traffic to and from RNC 140 related to a broken out subscriber session and provide a keep-alive channel maintenance mechanism.

Figure 18:
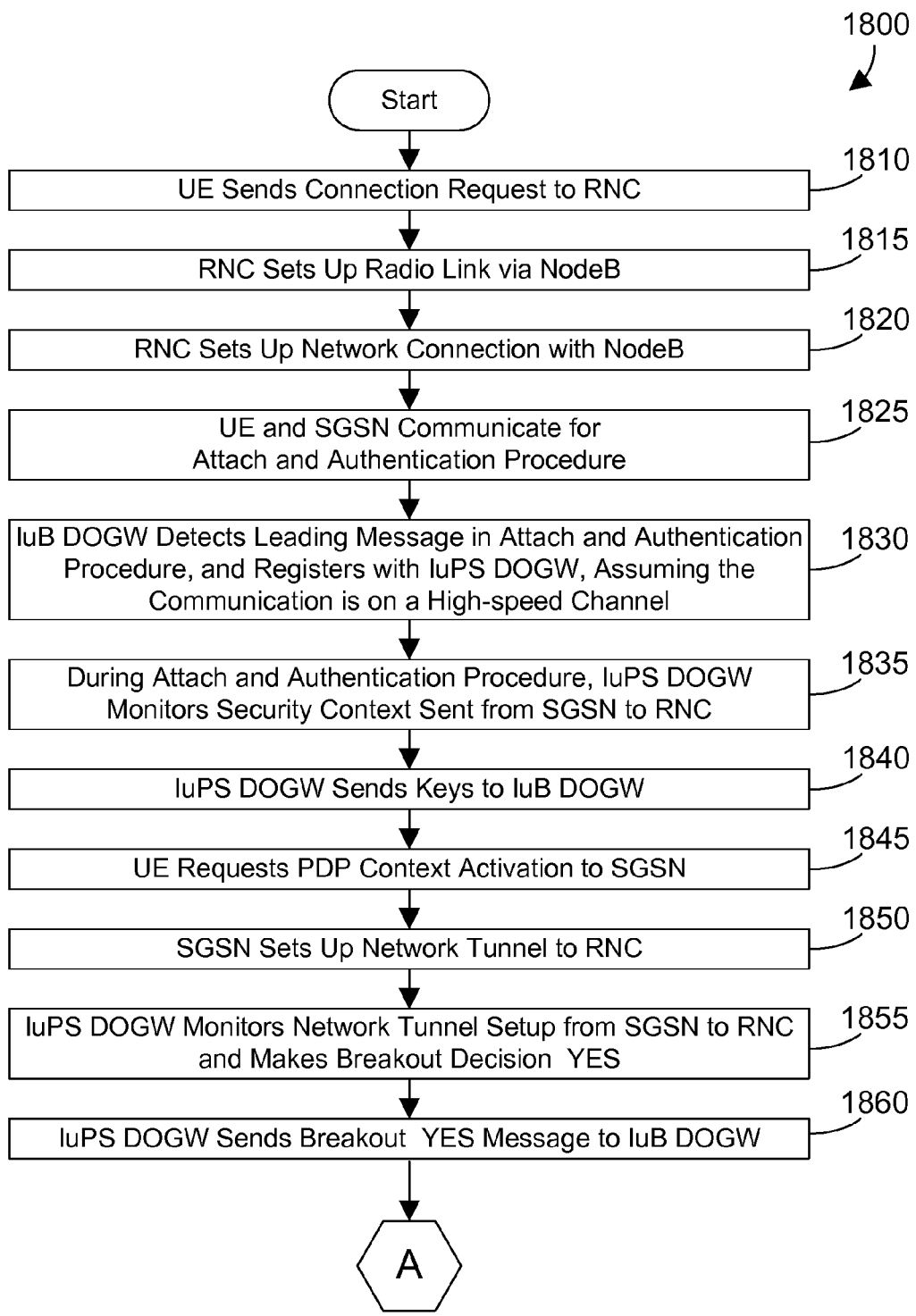
FIGS. 18 and 19 show a flow diagram of a first method for the specific implementation shown in FIG. 17.
Figure 19:
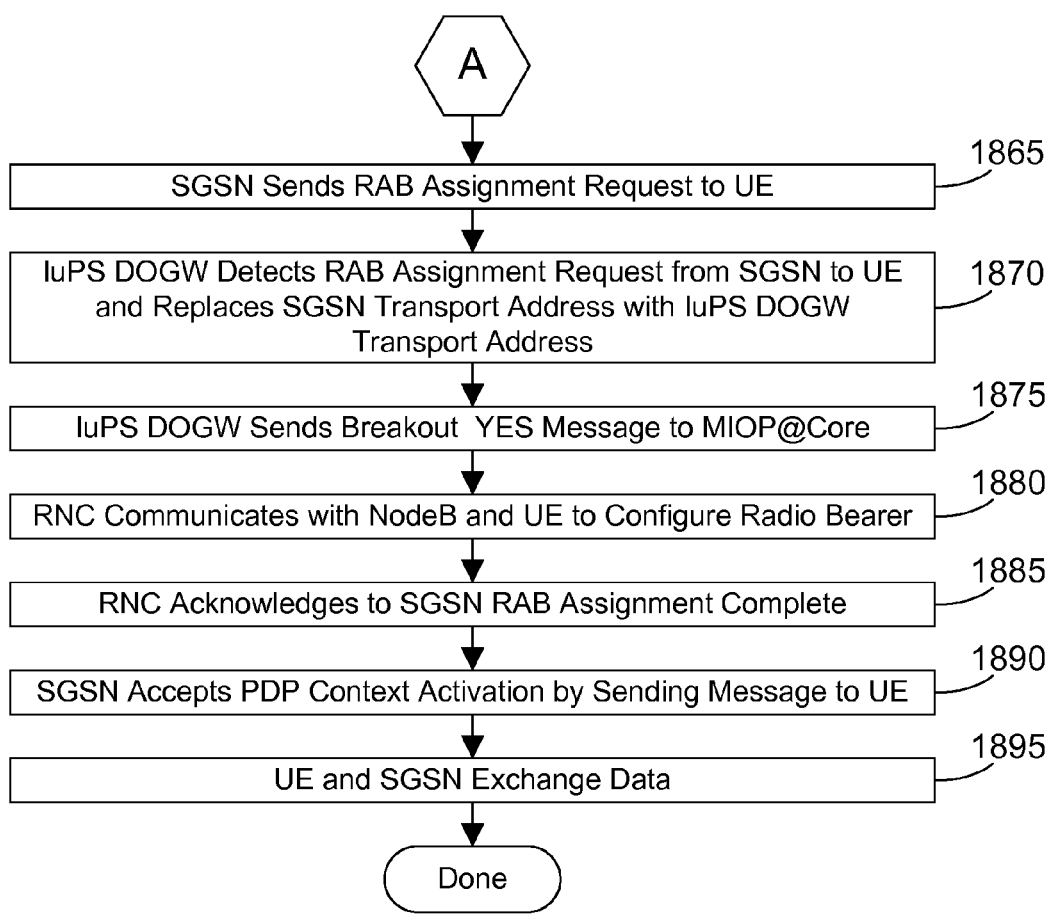

Specific methods are shown in FIGS. 18-21 that illustrate how the specific implementation in FIG. 17 could be used. FIGS. 18 and 19 show a method 1800 for setting up breakout of data. The UE sends a connection request to the RNC (step 1810). The RNC sets up a radio link via NodeB (step 1815). The RNC then sets up a network connection with NodeB (step 1820). The UE and SGSN then communicate for the attach and authentication procedure (step 1825). IuB DOGW detects the leading message in the attach and authentication procedure, and registers the subscriber session with IuPS DOGW when preconditions are fulfilled (e.g. UE is capable to carry high speed traffic) (step 1830). During the attach and authentication procedure, IuPS DOGW monitors the security context sent from SGSN to RNC (step 1835). IuPS DOGW then sends keys to IuB DOGW (step 1840). These keys are needed to decipher (decrypt) the upcoming signaling and uplink user data and to cipher (encrypt) the downlink user data. UE then requests PDP context activation to SGSN (step 1845). In response, SGSN sets up a network tunnel to RNC (step 1850). IuPS DOGW monitors network tunnel setup from SGSN to RNC and makes a decision breakout=YES (step 1855). IuPS DOGW sends a message to IuB DOGW indicating breakout=YES (step 1860). Continuing on FIG. 19, SGSN sends an RAB assignment request to UE (step 1865). IuPS DOGW detects the RAB assignment request from SGSN to UE and replaces the SGSN transport address with IuPS DOGW transport address (step 1870). IuPS DOGW sends a message to MIOP@Core indicating breakout=YES (step 1875). RNC communicates with NodeB and UE to (re) configure signaling and data radio bearer (step 1880). RNC acknowledges to SGSN when RAB assignment is complete (step 1885). SGSN accepts PDP context activation by sending a message to UE (step 1890). UE and SGSN may then exchange data for the PDP context (step 1895).

Figure 20:
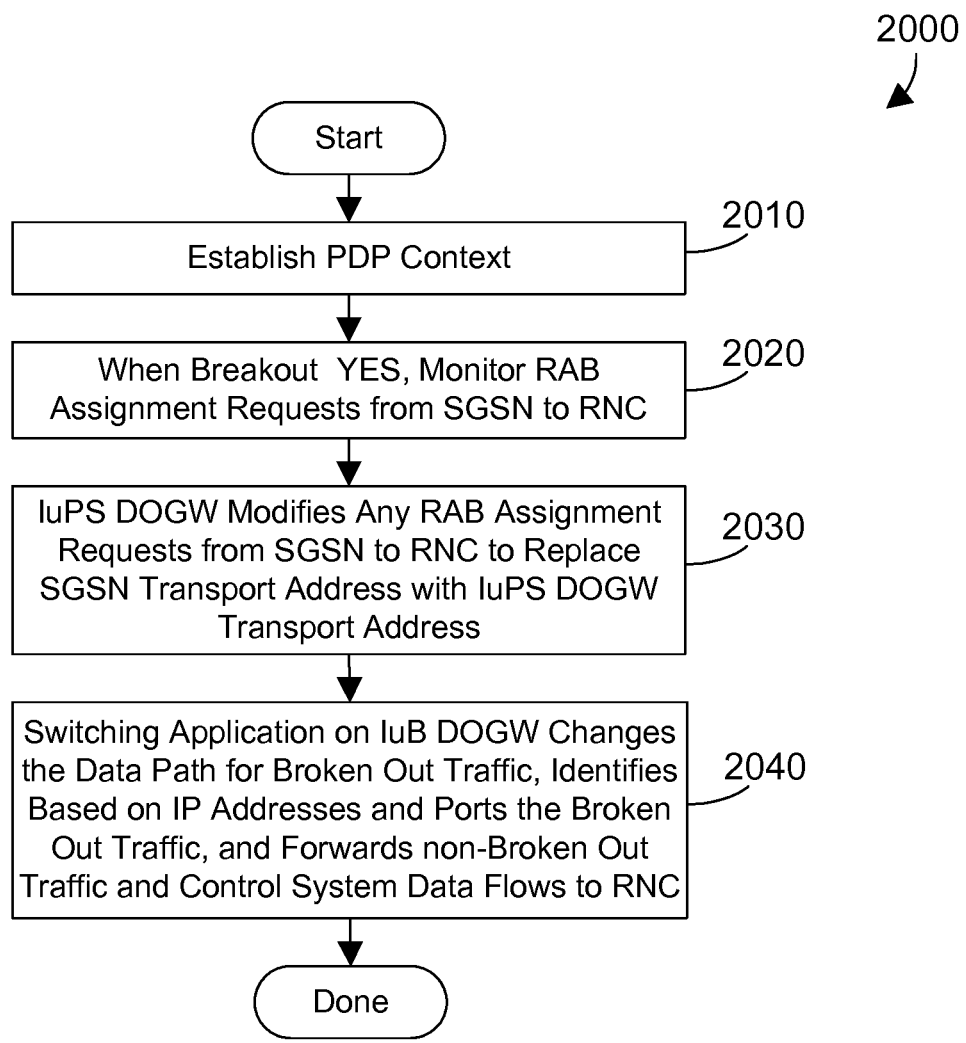
FIG. 20 is a flow diagram of a second method for the specific implementation shown in FIG. 17.

Referring to FIG. 20, a method 2000 begins by establishing a PDP context (step 2010). Method 1800 in FIGS. 18 and 19 include the detailed steps for establishing a PDP context. When breakout=YES, RAB assignment requests from SGSN to RNC are monitored by IuPS DOGW (step 2020). IuPS DOGW modifies any RAB assignment requests from SGSN to RNC to replace the SGSN transport address in the RAB assignment request with the IuPS DOGW transport address (step 2030) in case of matching breakout criteria during PDP context activation procedure. The switching application on IuB DOGW is configured upon the RAN transport layer setup to identify based on IP addresses and ports the broken out traffic and forwards this traffic to the Offload data handler 1765, and forwards non-broken out traffic and control system data flows to the RNC (step 2040).

Figure 21:
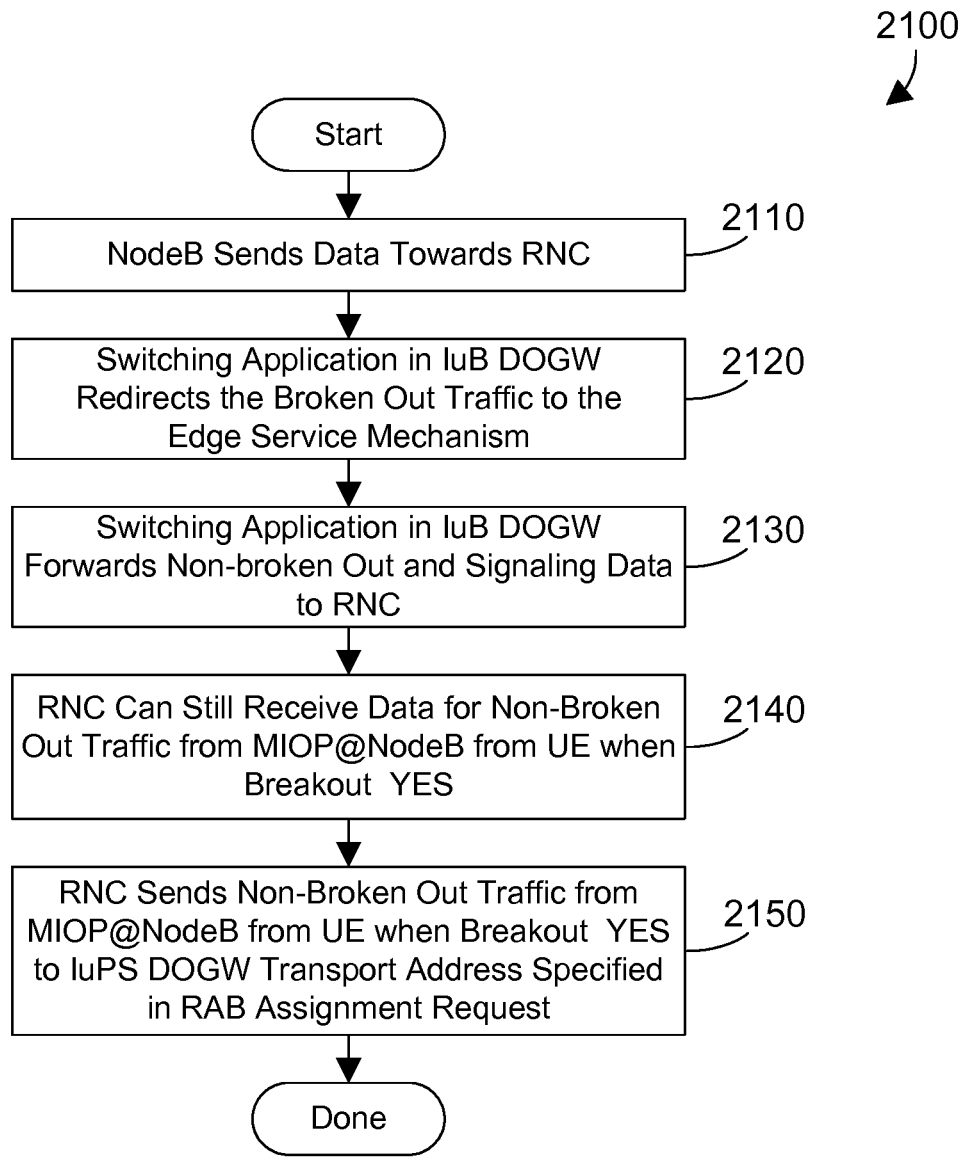
FIG. 21 is a flow diagram of a third method for the specific implementation shown in FIG. 17.

Referring to FIG. 21, a method 2100 begins when NodeB sends data towards RNC (step 2110). The switching application in IuB DOGW redirects the broken out traffic to the edge service mechanism (step 2120), such as edge cache mechanism 1730 in FIG. 17. The switching application also forwards non-broken out data and signaling data to the RNC (step 2130) via the original RAN connections. The RNC can still receive data for non-broken out traffic from MIOP@NodeB when breakout=YES (step 2140). The RNC then sends non-broken out traffic from MIOP@NodeB from UE when breakout=YES to IuPS DOGW transport address specified in RAB assignment request (step 2150).

Figure 22:
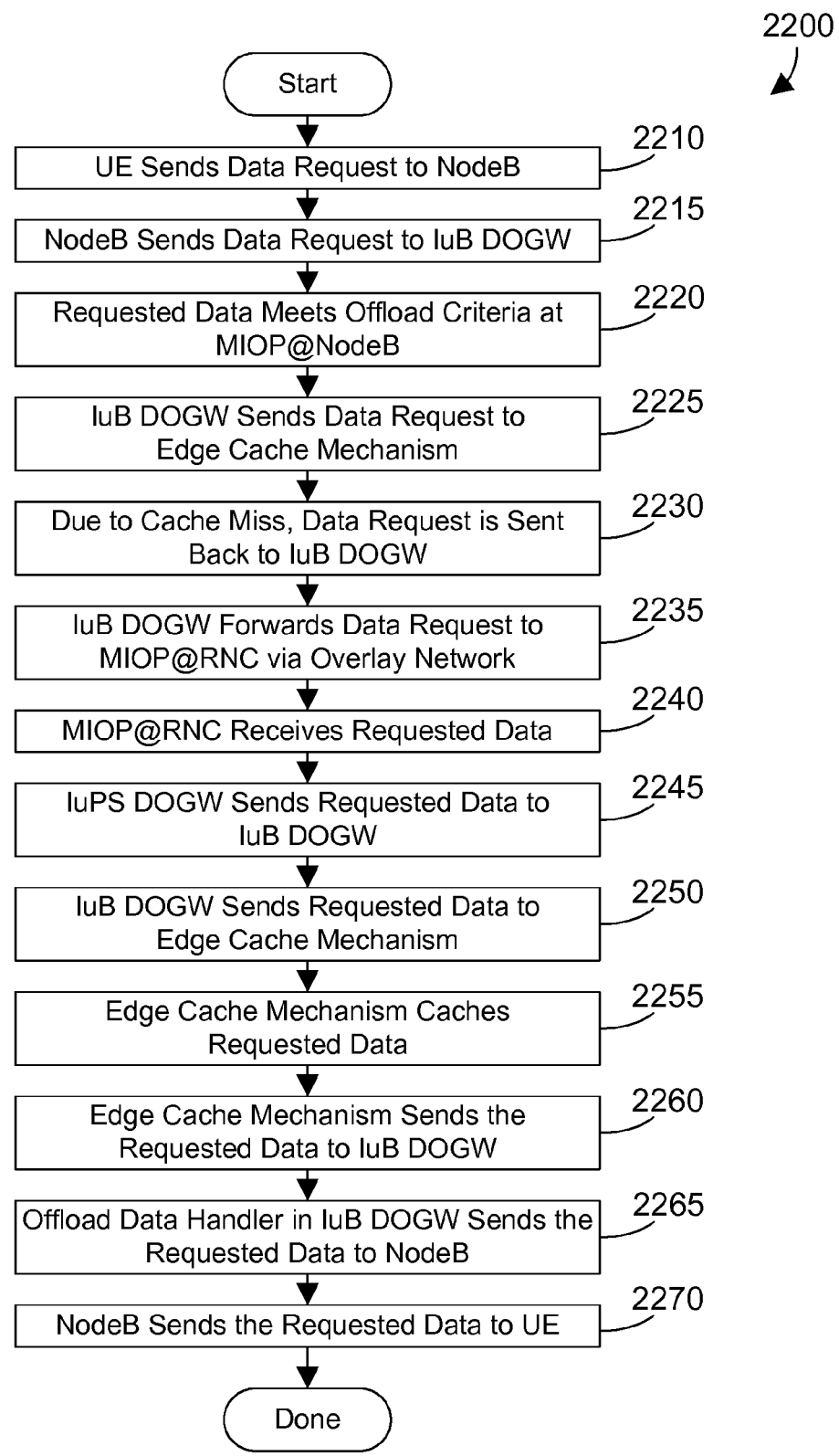
FIG. 22 is a flow diagram of a method for the specific implementation shown in FIG. 17 to process a data request that results in a cache miss at MIOP@NodeB.

A simple example is now provided for the specific implementation in FIG. 17 to show how data can be cached and delivered by MIOP@NodeB 210. Referring to FIG. 22, method 2200 represents steps performed in the implementation in FIG. 17 for a cache miss. UE sends a data request to NodeB (step 2210). NodeB sends the data request to IuB DOGW (step 2215). We assume the requested data meets the offload criteria at MIOP@NodeB (step 2220), which means MIOP@NodeB has been authorized to perform breakout and has determined this requested data should be broken out. IuB DOGW sends the data request to the edge cache mechanism (step 2225). We assume the data is not present in the edge cache mechanism, so due to the cache miss, the edge cache mechanism sends the data request back to IuB DOGW (step 2230). IuB DOGW then forwards the data request to MIOP@RNC via the overlay network (step 2235). In the worst case the content is not cached on MIOP@RNC or MIOP@Core, MIOP@RNC routes the data request to via the overlay network to the MIOP@Core, which passes the data request up the line to the internet, which delivers the requested data to MIOP@Core, which delivers the requested data via the overlay network to MIOP@RNC (step 2240). IuPS DOGW then sends the requested data to IuB DOGW (step 2245). IuB DOGW then sends the requested data to the edge cache mechanism (step 2250). The edge cache mechanism caches the requested data (step 2255). The edge cache mechanism sends the requested data to IuB DOGW (step 2260). The offload data handler in IuB DOGW sends the requested data to NodeB (step 2265). NodeB then sends the requested data to UE (step 2270). At this point, method 2200 is done.

Figure 23:
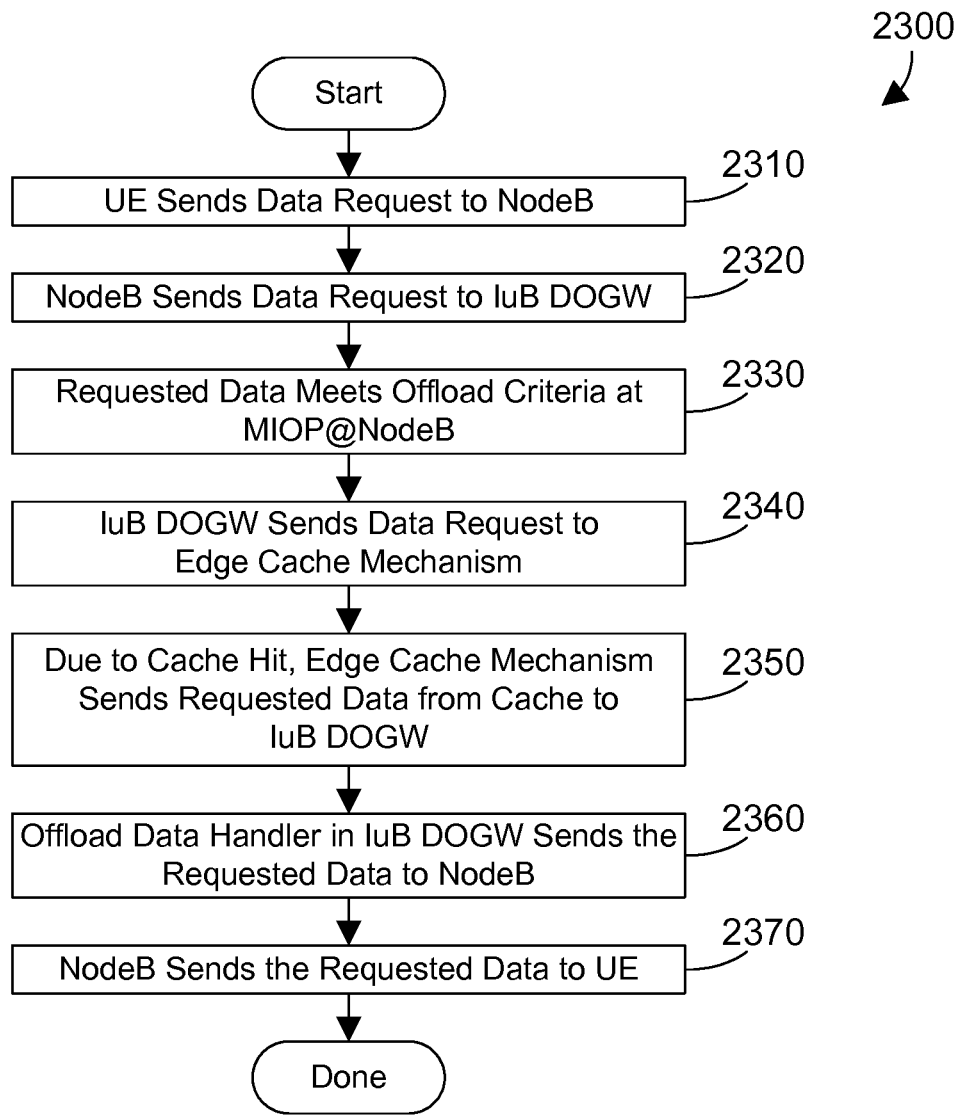
FIG. 23 is a flow diagram of a method for the specific implementation shown in FIG. 17 to process a data request that results in a cache hit at MIOP@NodeB.

Method 2300 in FIG. 23 shows the steps performed for a cache hit in the specific implementation in FIG. 17. The UE sends the data request to NodeB (step 2310). NodeB sends the data request to IuB DOGW (step 2320). The requested data meets the offload criteria at MIOP@NodeB (step 2330). IuB DOGW sends the data request to the edge cache mechanism (step 2340). Due to a cache hit, the edge cache mechanism sends the requested data from the cache to IuB DOGW (step 2350). The offload data handler in IuB DOGW sends the requested data to NodeB (step 2360). Node B then sends the requested data to UE (step 2370). Method 2300 shows a great advantage in caching data at MIOP@NodeB. With data cached at MIOP@NodeB, the data may be delivered to the user equipment without any backhaul on the core network. The result is reduced network congestion in the core network while improving quality of service to the subscriber.

The methods shown in FIGS. 18-23 provide detailed steps for the specific implementation in FIG. 17. Other implementations may have detailed steps that are different than those shown in FIGS. 18-23. These are shown by way of example, and are not limiting of the disclosure and claims herein.

The architecture of the MIOP system allows services to be layered or nested. For example, the MIOP system could determine to do breakout of high-speed channels at MIOP@NodeB, and to do breakout of low-speed channels at MIOP@RNC. In another example, MIOP@NodeB may have a cache, MIOP@RNC may also have a cache, and MIOP@Core may also have a cache. If there is a cache miss at MIOP@NodeB, the cache in MIOP@RNC could be checked, followed by checking the cache in MIOP@Core. Thus, decisions can be dynamically made according to varying conditions of what data to cache and where.

To support the MIOP services that are possible with the mobile data network 200 shown in FIG. 2, the preferred configuration of MIOP@NodeB 210 is a combination of hardware and software. The preferred configuration of MIOP@RNC 220 is also a combination of hardware and software. The preferred configuration of MIOP@Core 230 is software only, and can be run on any suitable hardware in the core network. The preferred configuration of MIOP@NMS 240 is software only, and can also be run on any suitable hardware in the core network.

In the most preferred implementation, the various functions of MIOP@NodeB 210, MIOP@RNC 220, MIOP@Core 230, and MIOP@NMS 240 are performed in a manner that is nearly transparent to existing equipment in the mobile data network. Thus, the components in prior art mobile data network 100 that are also shown in the mobile data network 200 in FIG. 2 have no knowledge of the existence of the various MIOP components, with the exception of existing routers that may need to be updated with routing entries corresponding to the MIOP components. The MIOP services are provided by the MIOP components in a way that requires no changes to hardware and only minor changes to software (i.e., new router entries) in any existing equipment in the mobile data network, thereby making the operation of the MIOP components transparent to the existing equipment once the MIOP components are installed and configured. The result is a system for upgrading existing mobile data networks as shown in FIG. 1 in a way that does not require extensive hardware or software changes to the existing equipment. The MIOP services herein can thus be performed without requiring significant capital expenditures to replace or reprogram existing equipment.

Referring to FIG. 24, one suitable hardware architecture for MIOP@NodeB 2410 is shown. MIOP@NodeB 2410 is one specific implementation for MIOP@NodeB 210 shown in FIGS. 2, 4 and 17. MIOP@NodeB 2410 is one suitable example of a breakout component that may be incorporated into an existing mobile data network. The specific architecture was developed based on a balance between needed function and cost. The hardware components shown in FIG. 24 may be common off-the-shelf components. They are interconnected and programmed in a way to provided needed function while keeping the cost low by using off-the-shelf components. The hardware components shown in FIG. 24 include a system controller 2412, a service processor 2420, a security subsystem 2430, and a telco breakout subsystem 2450. In one suitable implementation for MIOP@NodeB 2410 shown in FIG. 24, the system controller 2412 is an x86 system. The service processor 2420 is an IBM Integrated Management Module version 2 (IMMv2). The security subsystem 2430 includes an ATMEL processor and a non-volatile memory such as a battery-backed RAM for holding keys. The telco breakout system 2450 performs the breakout functions for MIOP@NodeB 2410. In this specific implementation, the x86 and IMMv2 are both on a motherboard that includes a Peripheral Component Interconnect Express (PCIe) slot. A riser card plugged into the PCIe slot on the motherboard includes the security subsystem 2430, along with two PCIe slots for the telco breakout system 2450. The telco breakout system 2450 may include a telco card and a breakout card that performs breakout as described in detail above with respect to FIG. 17.

One suitable x86 processor that could serve as system controller 2412 is the Intel Xeon E3-1220 processor. One suitable service processor 2420 is an IBM Renassas SH7757, but other known service processors could be used. One suitable processor for the security subsystem 2430 is an ATMEL processor UC3L064, and one suitable non-volatile memory for the security subsystem 2430 is a DS3645 battery-backed RAM from Maxim. One suitable processor for the telco breakout subsystem 2450 is the Cavium Octeon II CN63XX.

Various functions of the MIOP@NodeB 2410 shown in FIG. 24 are divided amongst the different components. Referring to FIG. 25, the system controller 2412 implements an appliance mechanism 2510, a platform services mechanism 2520, and an edge application serving mechanism 2530. The appliance mechanism 2510 provides an interface to MIOP@NodeB that hides the underlying hardware and software architecture by providing an interface that allows configuring and using MIOP@NodeB without knowing the details of the underlying hardware and software. The platform services mechanism 2520 provides messaging support between the components in MIOP@NodeB, allows managing the configuration of the hardware and software in MIOP@NodeB, and monitors the health of the components in MIOP@NodeB. The edge application serving mechanism 2530 allows software applications to run within MIOP@NodeB that perform one or more mobile network services at the edge of the mobile data network in response to broken-out data received from user equipment or sent to user equipment. In the most preferred implementation, the data broken out and operated on by MIOP@NodeB is Internet Protocol (IP) data requests received from the user equipment and IP data sent to the user equipment. The edge application service mechanism 2530 may serve both applications provided by the provider of the mobile data network, and may also serve third party applications as well. The edge application serving mechanism 2530 provides a plurality of mobile network services to user equipment at the edge of the mobile data network in a way that is mostly transparent to existing equipment in the mobile data network.

Referring to FIG. 26, the service processor 2420 includes a thermal monitor/control mechanism 2610, a hardware monitor 2620, a fail-to-wire control mechanism 2630, a key mechanism 2640, a system controller monitor/reset mechanism 2650, and a display/indicator mechanism 2660. The thermal monitor/control mechanism 2610 monitors temperatures and activates controls to address thermal conditions. For example, the thermal monitor 2610 monitors temperature within the MIOP@NodeB enclosure, and activates one or more fans within the enclosure when the temperature exceeds some threshold. In addition, the thermal monitor/control mechanism 2610 may also monitor temperature in the basestation external to the MIOP@NodeB enclosure, and may control environmental systems that heat and cool the basestation itself external to the MIOP@NodeB enclosure. The hardware monitor 2620 monitors hardware for errors. Examples of hardware that could be monitored with hardware monitor 2620 include CPUs, memory, power supplies, etc. The hardware monitor 2620 could monitor any of the hardware within MIOP@NodeB 2410.

The fail-to-wire control mechanism 2630 is used to switch a fail-to-wire switch to a first operational state when MIOP@NodeB is fully functional that causes data between the upstream computer system and the downstream computer system to be processed by MIOP@NodeB 2410, and to a second failed state that causes data to be passed directly between the upstream computer system and the downstream computer system without being processed by MIOP@NodeB 2410. The key mechanism 2640 provides an interface for accessing the security subsystem 2430. The system controller monitor/reset mechanism 2650 monitors the state of the system controller 2412, and resets the system controller 2412 when needed. The display/indicator mechanism 2660 activates a display and indicators on the front panel of the MIOP@NodeB to provide a visual indication of the status of MIOP@NodeB.

Referring to FIG. 27, the security subsystem 2430 includes a key storage 2702 that is a non-volatile storage for keys, such as a battery-backed RAM. The security subsystem 2430 further includes a key mechanism 2710 and a tamper detection mechanism 2720. Key mechanism 2710 stores keys to the non-volatile key storage 2702 and retrieves keys from the non-volatile key storage 2702. Any suitable keys could be stored in the key storage 2702. The security subsystem 2430 controls access to the keys stored in key storage 2702 using key mechanism 2710. The tamper detection mechanism 2720 detects physical tampering of MIOP@NodeB, and performs functions to protect sensitive information within MIOP@NodeB when physical tampering is detected. The enclosure for MIOP@NodeB includes tamper switches that are triggered if an unauthorized person tries to open the box. In response, the tamper detection mechanism may take any suitable action, including actions to protect sensitive information, such as not allowing MIOP@NodeB to boot the next time, erasing keys in key storage 2702, and actions to sound an alarm that the tampering has occurred.

Referring to FIG. 28, the telco breakout system 2450 includes a telco card 2802, a breakout mechanism 2810, and an overlay network mechanism 2820. Telco card 2802 is any suitable card for handling network communications in the radio access network. Breakout mechanism 2810 is one specific implementation for breakout mechanism 410 shown in FIG. 4. Breakout mechanism 2810 performs the breakout functions as described in detail above. The breakout mechanism 2810 interrupts the connection between the NodeB and the next upstream component in the radio access network, such as the RNC, as shown in FIG. 2. Non-broken out data from the upstream component is simply passed through MIOP@NodeB to the NodeB. Non-broken out data from the NodeB is simply passed through MIOP@NodeB to the upstream component. Note the path for non-broken out data is the traditional path for data in the mobile data network before the MIOP components were added. Broken-out data is intercepted by MIOP@NodeB, and may be appropriate processed at MIOP@NodeB, or may be routed to an upstream component via a different data path, such as to MIOP@RNC via the overlay network. The telco breakout system 2450 includes an overlay network mechanism 2820 that allows MIOP@NodeB 2410 to communicate via the overlay network. For example, MIOP@NodeB 2410 could use overlay network mechanism 2820 to communicate with MIOP@RNC 220 or to communicate with other MIOP@NodeBs.

The edge application mechanism 2530 may provide many different mobile network services. Examples of some of these services are shown in FIG. 29. This specific implementation for edge application mechanism 2530 includes an edge caching mechanism 2910, a push-based service mechanism 2920, a third party edge application serving mechanism 2930, an analytics mechanism 2940, a filtering mechanism 2950, a revenue-producing service mechanism 2960, and a charging mechanism 2970. The edge caching mechanism 2910 is one suitable implementation of edge cache mechanism 1730 shown in FIG. 17, and includes the functions described above with respect to FIG. 17. The push-based service mechanism 2920 provides support for any suitable push-based service, whether currently known or developed in the future. Examples of known push-based services include without limitation incoming text messages, incoming e-mail, instant messaging, peer-to-peer file transfers, etc.

The third party edge application serving mechanism 2930 allows running third party applications that provide mobile network services at the edge of the mobile data network. The capability provided by the third party edge application serving mechanism 2930 opens up new ways to generate revenue in the mobile data network. The operator of the mobile data network may generate revenue both from third parties that offer edge applications and from subscribers who purchase or use edge applications. Third party applications for user equipment has become a very profitable business. By also providing third party applications that can run at the edge of the mobile data network, the experience of the user can be enhanced. For example, face recognition software is very compute-intensive. If the user were to download an application to the user equipment to perform face recognition in digital photographs, the performance of the user equipment could suffer. Instead, the user could subscribe to or purchase a third party application that runs at the edge of the mobile data network (executed by the third party edge application serving mechanism 2930) that performs face recognition. This would allow a subscriber to upload a photo and have the hardware resources in MIOP@NodeB perform the face recognition instead of performing the face recognition on the user equipment. We see from this simple example it is possible to perform a large number of different functions at the edge of the mobile data network that were previously performed in the user equipment or upstream in the mobile data network. By providing applications at the edge of the mobile data network, the quality of service for subscribers increases.

The analytics mechanism 2940 performs analysis of broken-out data. The results of the analysis may be used for any suitable purpose or in any suitable way. For example, the analytics mechanism 2940 could analyze IP traffic on MIOP@NodeB, and use the results of the analysis to more intelligently cache IP data by edge caching mechanism 2910. In addition, the analytics mechanism 2940 makes other revenue-producing services possible. For example, the analytics mechanism 2940 could track IP traffic and provide advertisements targeted to user equipment in a particular geographic area served by the basestation. Because data is being broken out at MIOP@NodeB, the analytics mechanism 2940 may perform any suitable analysis on the broken out data for any suitable purpose.

The filtering mechanism 2950 allows filtering content delivered to the user equipment by MIOP@NodeB. For example, the filtering mechanism 2950 could block access to adult websites by minors. This could be done, for example, via an application on the user equipment or via a third party edge application that would inform MIOP@NodeB of access restrictions, which the filtering mechanism 2950 could enforce. The filtering mechanism 2950 could also filter data delivered to the user equipment based on preferences specified by the user. For example, if the subscriber is an economist and wants news feeds regarding economic issues, and does not want to read news stories relating to elections or politics, the subscriber could specify to exclude all stories that include the word "election" or "politics" in the headline. Of course, many other types of filtering could be performed by the filtering mechanism 2950. The filtering mechanism 2950 preferably performs any suitable data filtering function or functions, whether currently known or developed in the future.

The revenue-producing service mechanism 2960 provides new opportunities for the provider of the mobile data network to generate revenue based on the various functions MIOP@NodeB provides. An example was given above where the analytics mechanism 2940 can perform analysis of data broken out by MIOP@NodeB, and this analysis could be provided by the revenue-producing service mechanism 2960 to interested parties for a price, thereby providing a new way to generate revenue in the mobile data network. Revenue-producing service mechanism 2960 broadly encompasses any way to generate revenue in the mobile data network based on the specific services provided by any of the MIOP components.

The charging mechanism 2970 provides a way for MIOP@NodeB to inform the upstream components in the mobile data network when the subscriber accesses data that should incur a charge. Because data may be provided to the subscriber directly by MIOP@NodeB without that data flowing through the normal channels in the mobile data network, the charging mechanism 2970 provides a way for MIOP@NodeB to charge the subscriber for services provided by MIOP@NodeB of which the core network is not aware. The charging mechanism 2970 tracks the activity of the user that should incur a charge, then informs a charging application in the core network that is responsible for charging the subscriber of the charges that should be billed.

The hardware architecture of MIOP@NodeB shown in FIGS. 24-29 allows MIOP@NodeB to function in a way that is mostly transparent to existing equipment in the mobile data network. For example, if an IP request from user equipment may be satisfied from data held in a cache by edge caching mechanism 2910, the data may be delivered directly to the user equipment by MIOP@NodeB without traversing the entire mobile data network to reach the Internet to retrieve the needed data. This can greatly improve the quality of service for subscribers by performing so many useful functions at the edge of the mobile data network. The core network will have no idea that MIOP@NodeB handled the data request, which means the backhaul on the mobile data network is significantly reduced. The MIOP components disclosed herein thus provide a way to significantly improve performance in a mobile data network by adding the MIOP components to an existing mobile data network without affecting most of the functions that already existed in the mobile data network. The MIOP breakout capability provides a way to significantly improve performance (though caching and other processing) as well as the ability to provide new functions at the edge (e.g., face recognition, gaming) without a requiring any equipment changes on the existing mobile data network.

Figure 30:
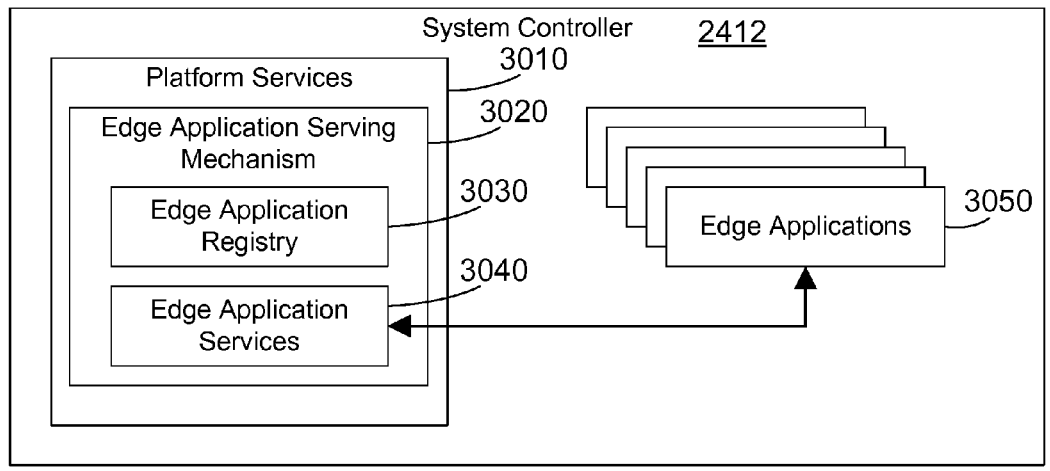
FIG. 30 is a block diagram showing hosting of edge applications at the edge of the mobile data network.

One specific implementation for the system controller 2412 in FIG. 24 is shown in FIG. 30. The system controller 2412 includes platform services 3010 that execute an edge application serving mechanism 3020. The edge application serving mechanism 3020 is a mechanism that serves not only edge applications provided by the mobile data network, but third party edge applications as well. Thus, the edge application serving mechanism 3020 in FIG. 30 may include all the functionality of the edge application mechanism 2530 and third party edge application serving mechanism 2930 shown in FIG. 29. The edge application serving mechanism 3020 maintains an edge application registry 3030 and a set of edge application services 3040. The edge application registry 3030 specifies edge applications that have been installed on MIOP@NodeB, along with metadata describing the access rights, types of data, filters on data, rules of operation for the edge application, and other parameters that define upon which broken out data the edge application may operate. The edge application services 3040 are a set of services that an edge application may call to provide services to the edge application, as illustrated by the arrow in FIG. 30 between the edge applications 3050 and the edge application services 3040. The edge application services 3040 are essentially a library of functions supported by the system controller 2412 (and hence, by MIOP@NodeB). Each of the edge applications 3050 is preferably run in a suitable virtual machine, such as a kernel-based virtual machine (KVM), which is well-known in the art. By running each edge application 3050 in its own KVM, this assures an edge application may not access any unauthorized information in the MIOP@NodeB outside the KVM, and may not access other edge applications in their own KVMs.

Figure 31:
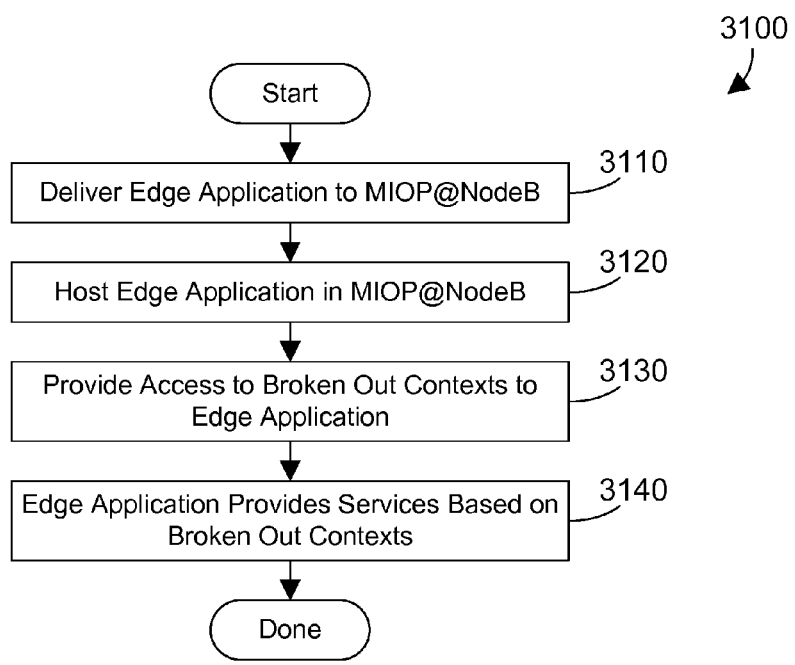
FIG. 31 is a flow diagram of a method for the edge application serving mechanism in FIG. 30.

Referring to FIG. 31, a method 3100 shows steps for the edge application serving mechanism 3020 to serve an edge application. The edge application is delivered to a MIOP@NodeB (step 3110). The edge application serving mechanism in the MIOP@NodeB hosts the edge application (step 3120). The edge application serving mechanism acts in concert with the breakout mechanism to provide access to broken out contexts to the edge application (step 3130). The edge application provides services based on broken out contexts (step 3140). Method 3100 is then done.

Figure 32:
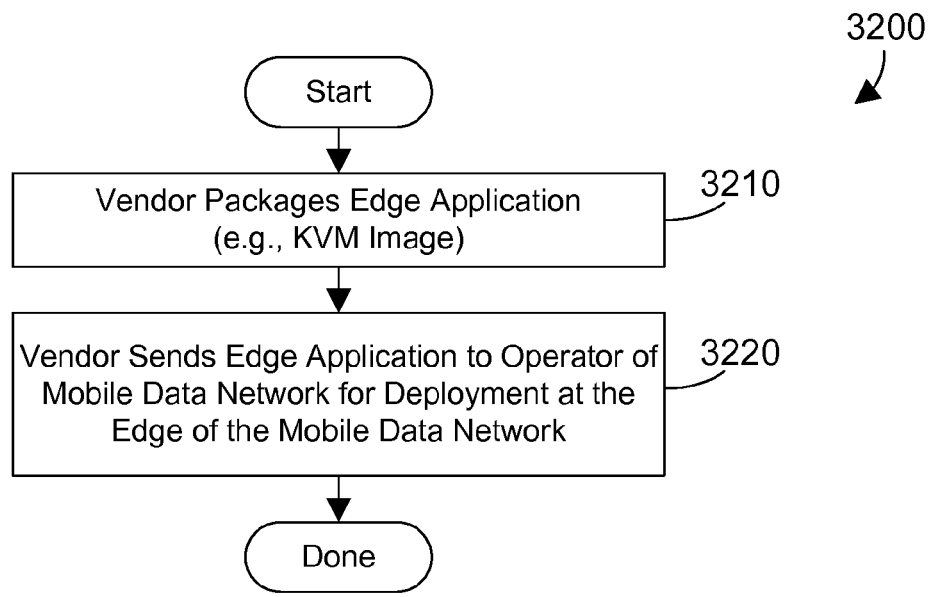
FIG. 32 is a flow diagram of a method for a vendor to send an edge application to a mobile data network.

Referring to FIG. 32, a method 3200 shows one suitable implementation for a portion of step 3110 in FIG. 31 that involves the operator of the mobile data network receiving the edge application from a vendor. A vendor packages the edge application into a suitable image (step 3210). One suitable type of image is a KVM image that will cause the edge application to run in its own kernel-based virtual machine (KVM). The vendor then sends the edge application to the operator of the mobile data network for deployment at the edge of the mobile data network (i.e., in MIOP@NodeBs) (step 3220). Method 3200 is then done.

Figure 33:
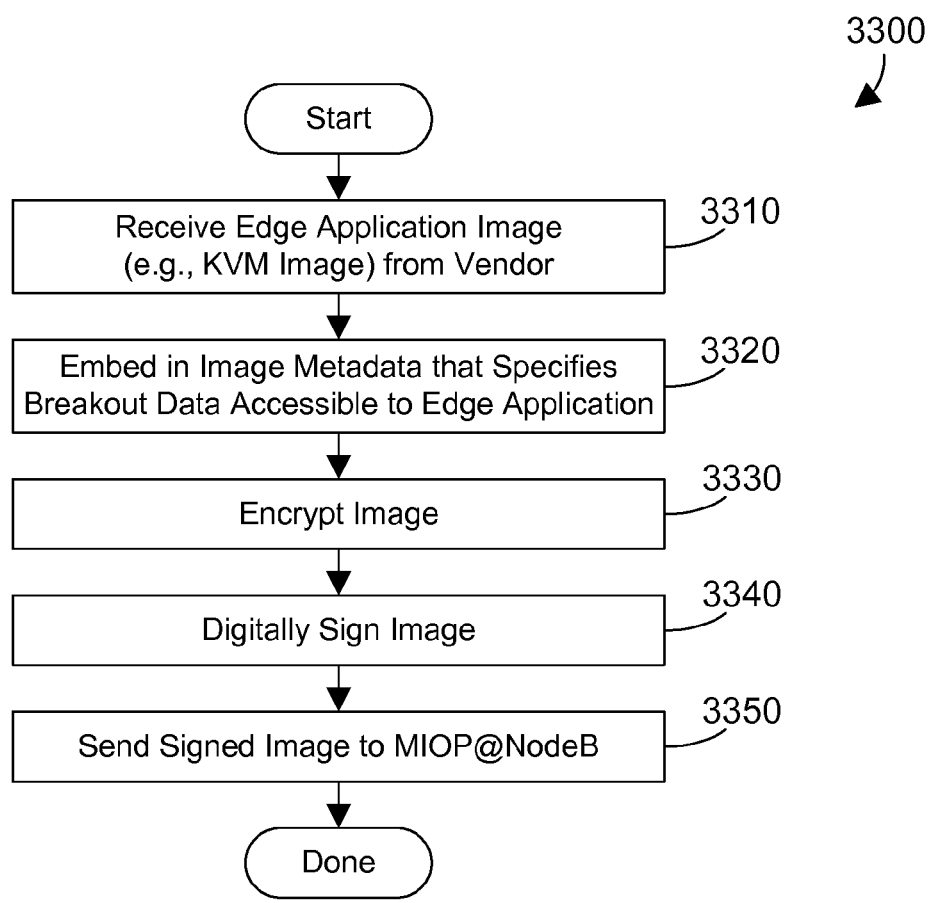
FIG. 33 is a flow diagram of a method for a mobile data network to handle an edge application once received.

Referring to FIG. 33, a method 3300 shows one suitable implementation for another portion of step 3110 in FIG. 31 that involves distributing the edge application to MIOP@NodeBs in the mobile data network. The operator of the mobile data network receives the edge application image (such as a KVM image) from the vendor (step 3310). Metadata that specifies breakout data accessible to the edge application is then embedded in the image (step 3320). The metadata may include permissions, revision/target protocol levels, references to allowable PDP context information, filters, or other mechanisms to allow the breakout mechanism to pass only the desired and allowed elements of the broken out stream to the edge application. The metadata could additionally include other suitable information, including version information, vendor information, dependencies the edge application may have (versions, other edge applications, etc.), description of what services the edge application provides, necessary connections to other systems within the mobile data network, etc. For example, for a face recognition edge application, the metadata in step 3320 could specify the edge application has permission to operate on any still image data files, such as .jpg, .gif, .pdf, etc. For a video processing edge application, the metadata in step 3320 could specify the edge application has permission to operate on any video files, such as .mov files. The examples above are not limiting. The disclosure and claims herein extend to any information in the metadata that specifies or identifies data or contexts the edge application may process. After embedding the metadata in step 3320, the image is encrypted (step 3330) and digitally signed (step 3340). The signed image is then sent to one or more MIOP@NodeBs in the mobile data network (step 3350).

Figure 34:
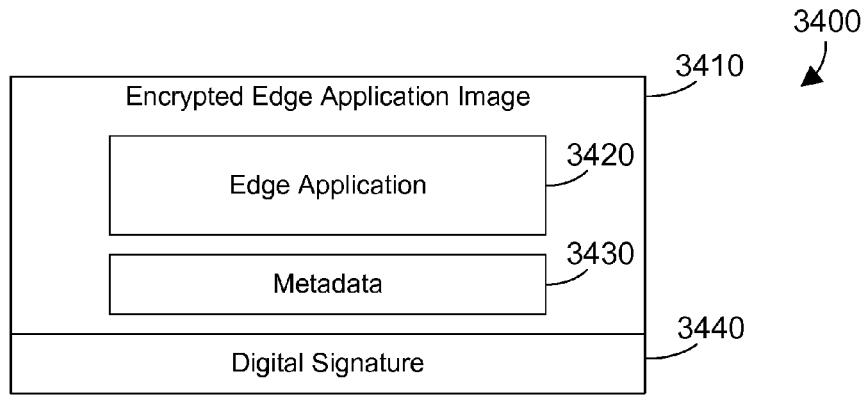
FIG. 34 is a block diagram of an encrypted edge application image that has been digitally signed.

FIG. 34 shows an encrypted, digitally signed edge application image 3400. The edge application 3420 and metadata 3430 are packaged together, then encrypted to generate the encrypted edge application image 3410. The encrypted edge application image 3410 is then signed with a digital signature 3440. The result is a package 3400 that is signed and encrypted that includes the edge application and metadata that includes permission and other information which specifies or identifies data or contexts the edge application has permission to process.

Figure 35:
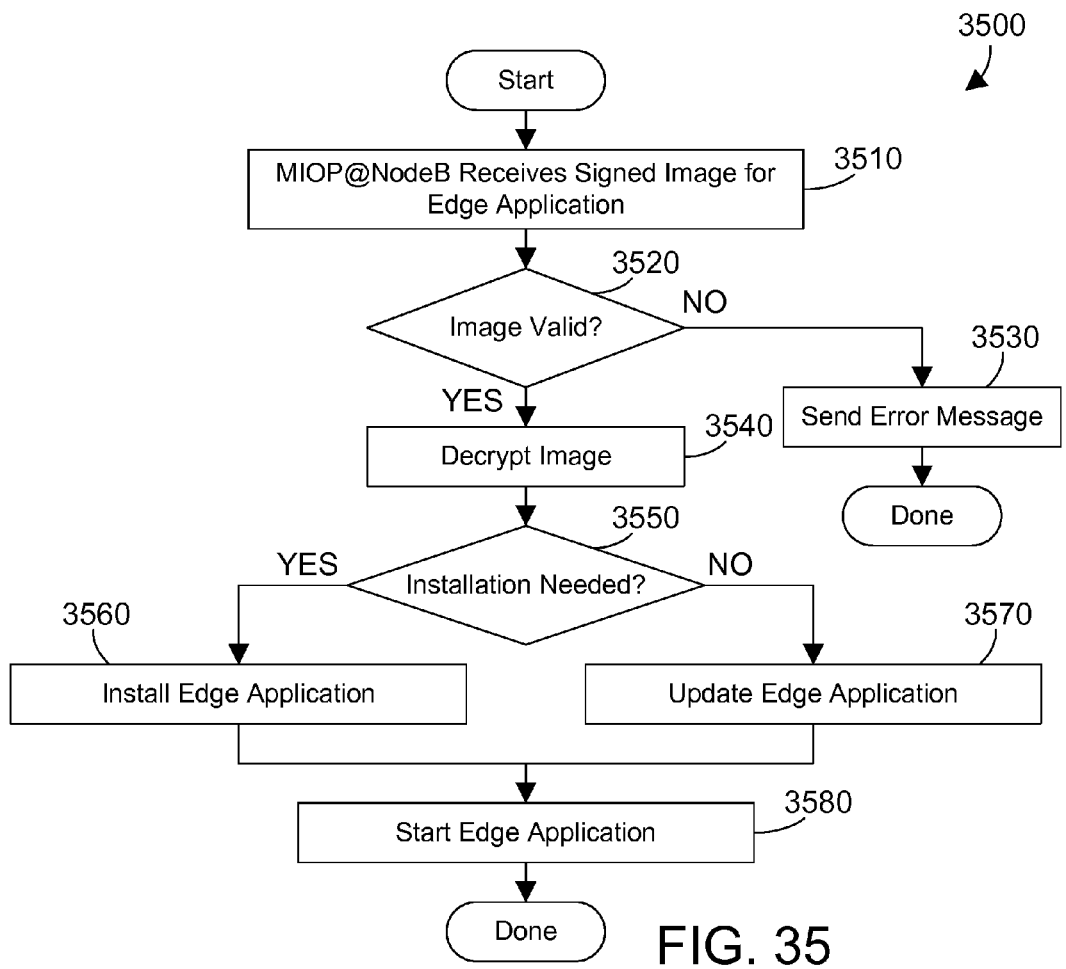
FIG. 35 is a flow diagram of a method for validating and starting an edge application.
Figure 36:
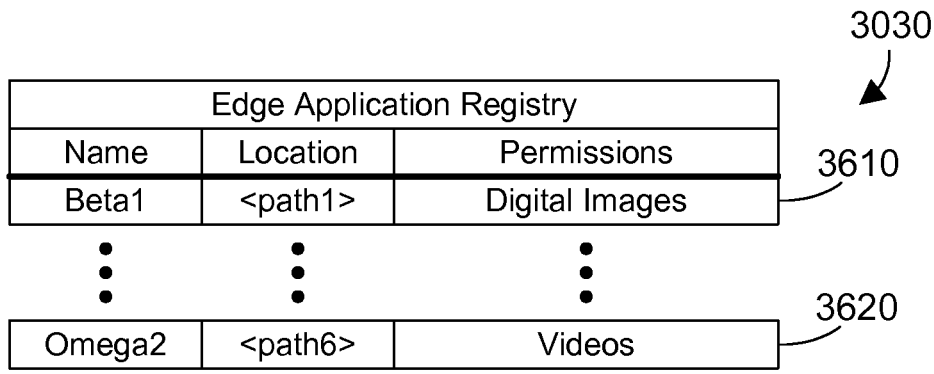
FIG. 36 is a block diagram of one suitable implementation of an edge application registry.

Referring to FIG. 35, method 3500 shows steps that are performed by the edge application serving mechanism 3020 in FIG. 30 once the package 3400 shown in FIG. 34 is received by a MIOP@NodeB (step 3510). The digital signature is checked to make sure the image package is valid (step 3520). When the image is not valid (step 3520=NO), an error message is sent (step 3530). For example, the MIOP@NodeB could send an error message to MIOP@NMS indicating the image it received is invalid. When the image is valid (step 3520=YES), the image is decrypted (step 3540). When installation is needed (step 3550=YES), the edge application is installed in the MIOP@NodeB (step 3560). Installing the edge application in the MIOP@NodeB in step 3560 includes writing an entry in the edge application registry 3030 in FIG. 30 for the edge application. When MIOP@NodeB boots, all applications that have an entry in the edge application registry 3030 are examined, and every edge application that is enabled (e.g., via a flag in the registry) will be started. Edge applications are started in accordance with access controls, performance/temperature concerns, location/time (e.g., some edge applications may only be enabled during morning and afternoon commute, others (like movie cache) may only be on during evening hours. An example of a suitable edge application registry 3030 is shown in FIG. 36 to include the name of the edge application, the location (or path) for the edge application, and permissions for the edge application. In the example in FIG. 36, there is an entry 3610 that specifies an edge application called Beta1 has a location defined by path1 and has permission to operate on digital image files. Entry 3620 specifies an edge application called Omega2 has a location defined by path6 and has permission to operate on video files. These entries are shown by way of example. The edge application registry may include any suitable information pertaining to the edge application that may be needed for the edge application serving mechanism to serve the edge application on MIOP@NodeB. Note the permissions in the edge application registry are preferably derived from the metadata (see 3430 in FIG. 34) that was sent in the package that included the edge application.

Referring back to FIG. 35, installation of the edge application is needed (step 3550=YES) when the edge application has not yet been installed on the MIOP@NodeB, which means the MIOP@NodeB does not have an entry in its edge application registry for the edge application. Installation is not needed (step 3550=NO) when the edge application is an update to an edge application that was previously installed. In that case, the edge application is updated (step 3570). Note that updating the edge application in step 3570 could include updating permissions for the edge application in the edge application registry. Thus, if an edge application has an update that expands its capability to a new file type, the new permission information will be written to the permissions portion of the entry in the edge application registry that corresponds to that edge application. Once the edge application is installed in step 3560 or updated in step 3570, the edge application is started (step 3580). Method 3500 is then done.

Figure 37:
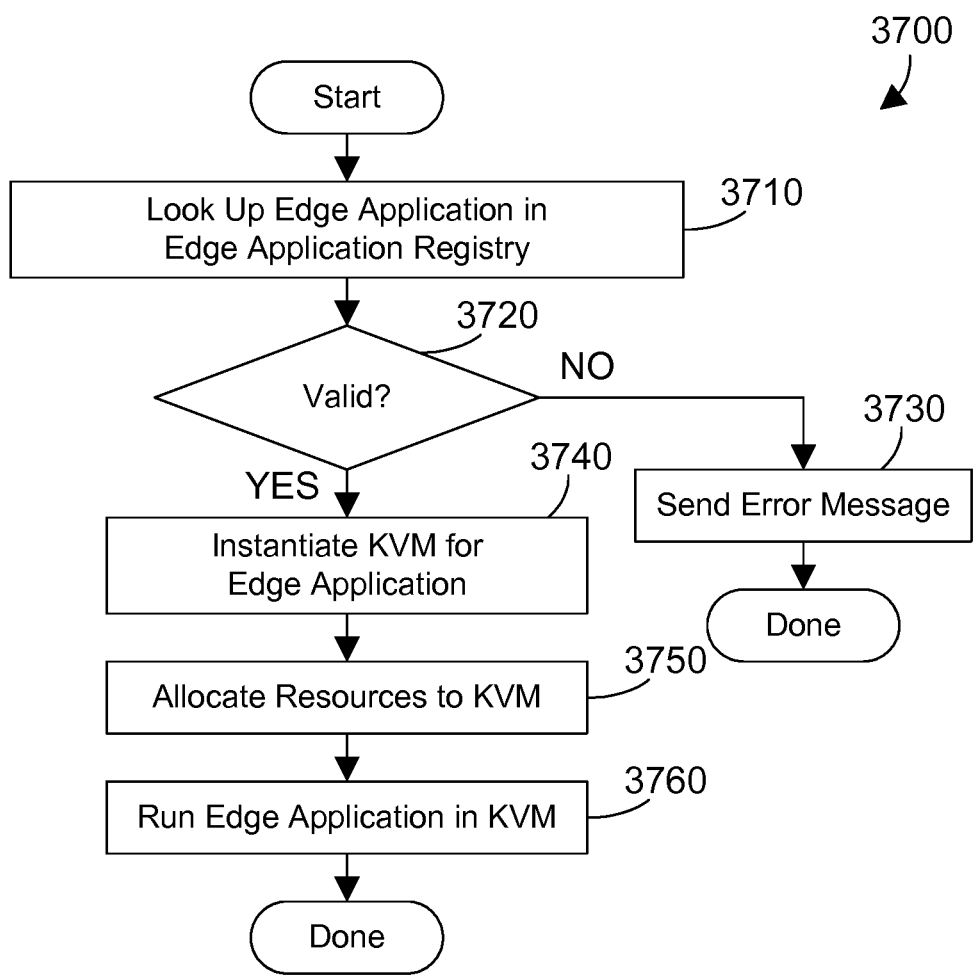
FIG. 37 is a flow diagram of a method for running an edge application.

Method 3700 shown in FIG. 37 is one suitable implementation for step 3580 in FIG. 35 of starting the edge application. First, the edge application is looked up in the edge application registry (step 3710). Then a check is made to make sure the edge application image is still valid (step 3720). This could include, for example, a re-check of the digital signature, and could also include other checks, such as checking to see if there is an update available for that edge application. If an update is available, the update could be retrieved using method 3300 in FIG. 33. Yet another check would be to compute a checksum on the edge application and send the checksum to MIOP@NMS to verify the checksum is correct. Note the check in step 3720 is optional depending on the level of security needed. When the image is not valid (step 3720=NO), an error message is sent (step 3730), and method 3700 is done. For example, MIOP@NodeB could send a message in step 3730 to MIOP@NMS indicating the edge application image package is not valid. When the image is valid (step 3720=YES), a kernel-based virtual machine (KVM) is instantiated for the edge application (step 3740). Resources are allocated to the KVM (step 3750), and the edge application is then run in the KVM (step 3760).

Figure 38:
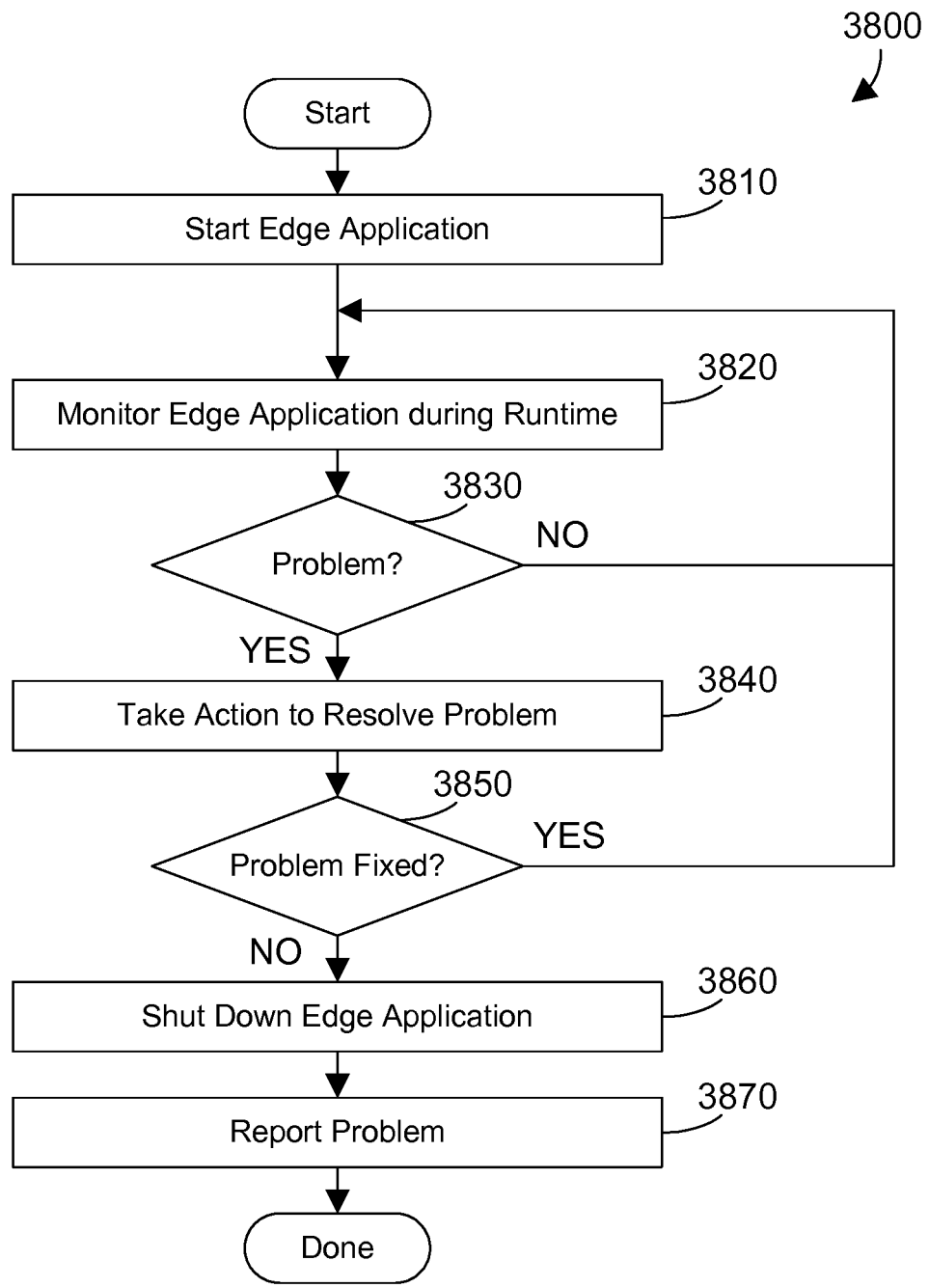
FIG. 38 is a flow diagram of a method for monitoring an edge application as it runs.

Referring to FIG. 38, a method 3800 could be implemented as part of hosting the edge application in step 3120 in FIG. 31. The edge application is started (step 3810), preferably using method 3700 in FIG. 37. The performance of the edge application is monitored during runtime (step 3820). If there is no problem with the edge application (step 3830=NO), method 3800 loops back to step 3820 and continues. When there is a problem with the edge application (step 3830=YES), action is taken to resolve the problem (step 3840). Many different actions could be taken within the scope of step 3840. For example, the edge application could be stopped and re-started. Additional resources could be allocated to the KVM for the application. Any suitable action that may help resolve a problem may be performed in step 3840. When the action taken in step 3840 resolves the problem (step 3850=YES), method 3800 loops back to step 3820 and continues. When the action taken in step 3840 does not fix the problem (step 3850=NO), the edge application is shut down (step 3860), and the problem is reported (step 3870). In step 3870, the problem could be reported to a problem log in MIOP@NodeB, or could be reported to an entity in the mobile data network, such as MIOP@NMS. Method 3800 is then done.

Figure 39:
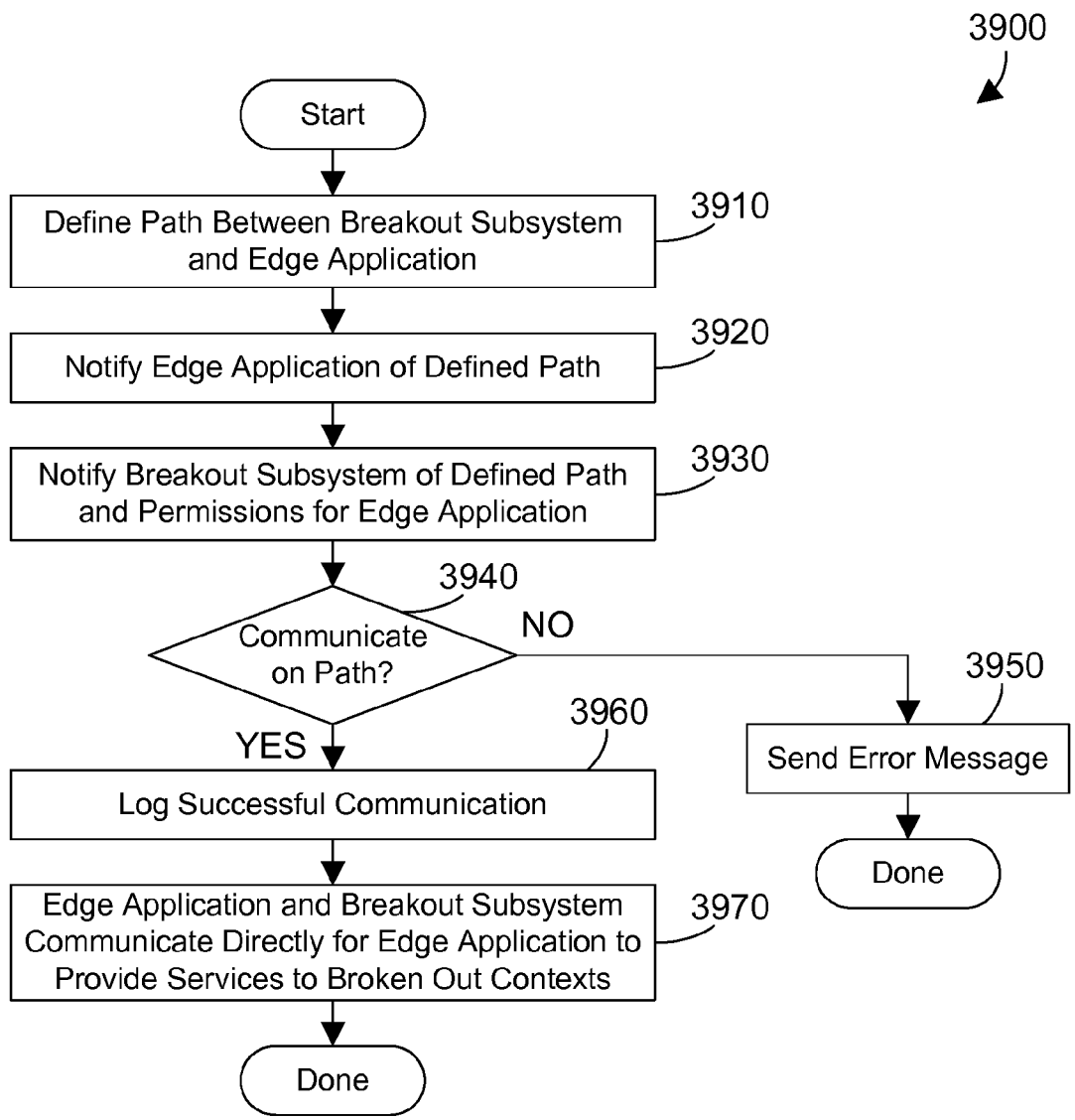
FIG. 39 is a flow diagram of a method for communicating between the breakout subsystem and an edge application.

Referring to FIG. 39, a method 3900 is one suitable implementation of step 3130 in FIG. 31 that provides access to broken out contexts to the edge application. A path is defined between the breakout system and the edge application (step 3910). For example, a virtual local area network (VLAN) can be defined that allows the two to communicate. The edge application is notified of the defined path (step 3920). The breakout subsystem is notified of the defined path and the permissions for the edge application (step 3930). The edge application and breakout subsystem send one or more test messages to verify communications on the defined path (step 3940). When the two are not able to communicate on the defined path (step 3940=NO), an error message is sent (step 3950), such as MIOP@NodeB sending an error message to MIOP@NMS. When the two can successfully communicate on the defined path (step 3940=YES), the successful communication is logged (step 3960), and the edge application and breakout system then communicate directly for the edge application to provide services to broken out data or contexts (step 3970). Method 3900 is then done.

Figure 40:
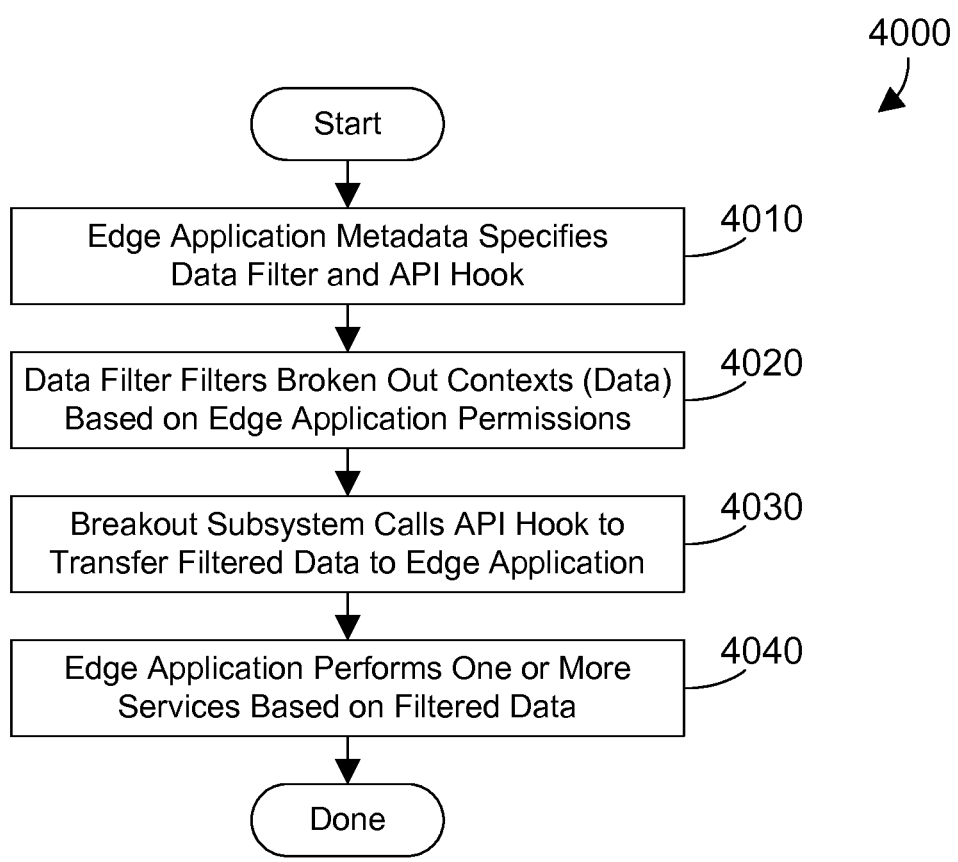
FIG. 40 is a flow diagram of a method for directly communicating between the breakout subsystem and an edge application using a data filter and API hook.

A more detailed example of providing access to broken out contexts to the edge application in step 3130 and the edge application performing one or more services in step 3140 in FIG. 31 is shown in method 4000 in FIG. 40. Method 4000 is one suitable implementation for step 3970 in FIG. 39. We assume for this example the edge application metadata specifies a data filter and an API hook (step 4010). The data filter is executable code that filters broken out data according to the edge application permissions (step 4020) so only data that satisfies the data filter is available to send to the edge application. The breakout subsystem then calls the API hook to transfer the filtered data to the edge application (step 4030). The edge application then performs one or more services based on the filtered data (step 4040). Method 4000 is then done. Of course, many other implementations of steps 3130 and 3140 in FIG. 31 are within the scope of the disclosure and claims herein.

Figure 41:
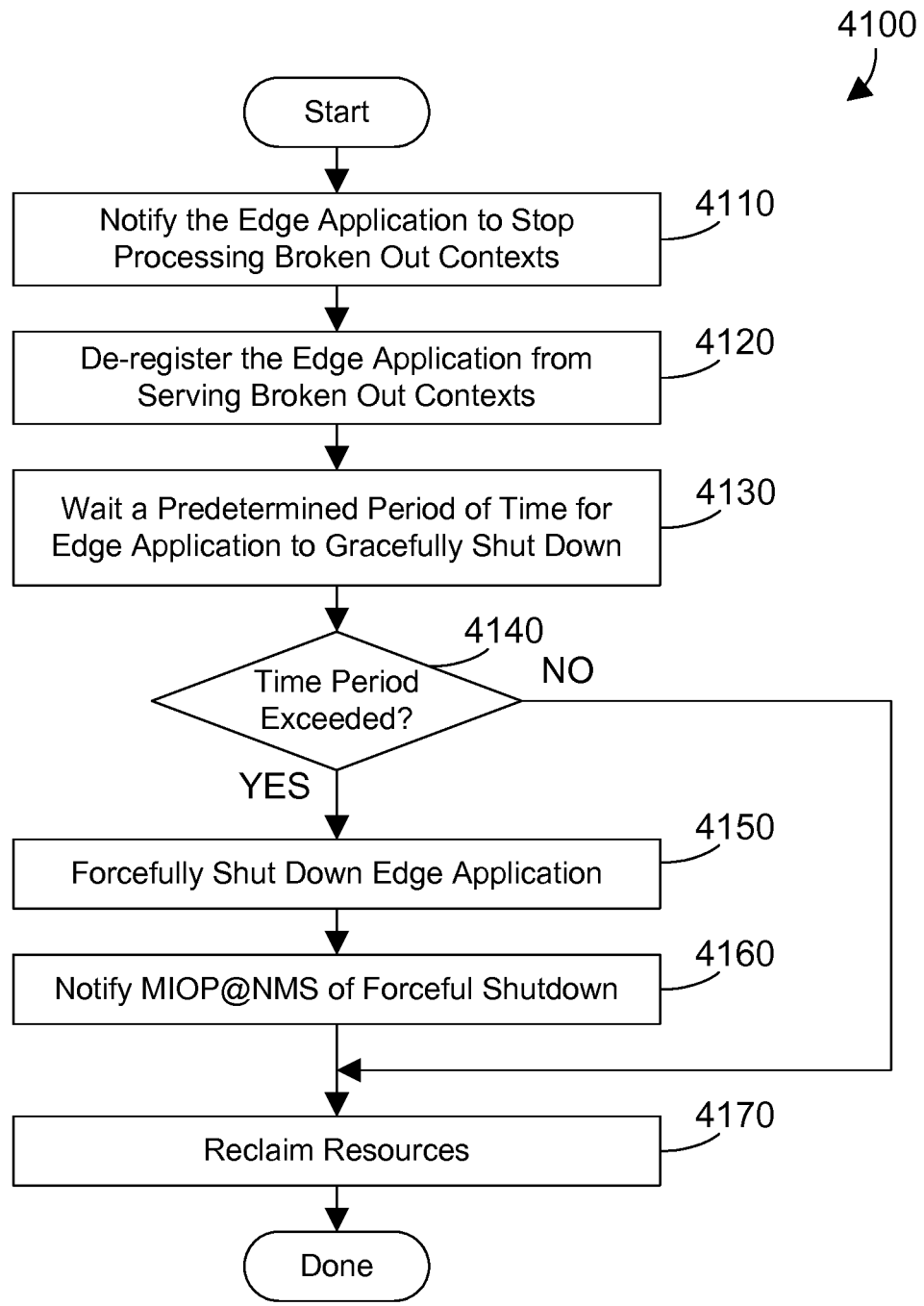
FIG. 41 is a flow diagram of a method for shutting down an edge application.

Referring to FIG. 41, a method 4100 shows one specific implementation for step 3860 in FIG. 38 to shut down the edge application. The edge application is notified to stop processing broken out contexts (step 4110). The edge application is de-registered from serving broken out contexts (step 4120). De-registering the edge application could mean simply setting a bit in the edge application registry that suspends the edge application from executing, or that suspends the edge application from operating on any broken out data. De-registering the edge application could also mean deleting the entry in the edge application registry (e.g., 3030 in FIG. 36) that corresponds to the edge application. Wait a predetermined period of time for the edge application to gracefully shut down (step 4130). Obviously, the predetermined period of time will depend on how long the edge application should take to gracefully shut down. If the edge application gracefully shuts down within the predetermined time period (step 4140=NO), the resources used by the KVM for the edge application are then reclaimed (step 4170), and method 4100 is done. If the edge application does not gracefully shut down within the predetermined time period (step 4140=YES), the edge application is forcefully shut down (step 4150), the MIOP@NMS is notified of the forceful shutdown (step 4160), and the resources used by the KVM for the edge application are reclaimed (step 4170). Method 4100 is then done.

As stated above with reference to FIG. 30, the edge application serving mechanism 3020 includes edge application services 3040, which is a library of predefined functions that may be invoked by edge applications. Because each edge application runs in a restricted environment (virtual machine), the edge application will not have access to anything outside the edge application except for those functions included in the edge application services 3040. Examples of suitable edge application services 3040 shown in FIG. 30 are shown in more detail in FIG. 42. A simple network management protocol (SNMP) service could be used for the edge application to raise fault management issues as traps to the edge application serving mechanism. These traps could be ignored, logged modified and sent to MIOP@NMS, or sent unmodified to MIOP@NMS. A network time protocol (NTP) service may be used to keep the clock in the KVM synchronized. For example, using the NTP service, the edge application could synchronize its clock with the clock on the system controller, or with a clock in on an NTP server deeper in the mobile data network. A command line interface (CLI) service could provide access to the CLI interface on MIOP@NodeB, which would allow the edge application to access the CLI for various operations. The CLI could be accessible, for example, via a secure shell (SSH) interface.

A collector service allows gathering audit and diagnostic data from the edge application. For example, the edge application may be informed via the collector service to make certain data or logs available, to collect the logged data via secure copy (SCP), or to send the logs or other data to MIOP@NMS for processing. A performance service allows gathering key performance indicators (KPIs) from the edge applications according to metadata, which may contain information about metrics to gather and could also specify names, memory locations, file names, or other things of interest for logging and data gathering. The performance service could use the collector service to gather performance data from the edge application, and to send the performance data to MIOP@NMS for further processing. The health/overload service provides health and overload monitoring of edge applications. For example, the health/overload service could include commands to query the edge application for health and overload information. The health/overload service could also provide a dedicated process in the edge application that monitors and reports health and overload information. The configuration services allows downloading the edge application configuration from MIOP@NMS, and allows saving or restoring edge application configuration. Thus, configuration for an edge application could be transferred from MIOP@NMS to MIOP@NodeB, then from MIOP@NodeB to the edge application via secure copy (SCP). The external communication service allows edge applications to communicate with one or more other systems in the mobile data network. The details of the connection to the other system may be specified in the image metadata or as part of a stored configuration for the edge application received from MIOP@NMS. One example where communication with another system is needed is when the edge application is a caching edge application that caches data locally on the MIOP@NodeB, but may also choose to cache data deeper in the mobile data network, such as on MIOP@RNC. The external communication services would be used by the caching edge application to communicate with a cache agent on MIOP@RNC.

One specific type of edge application that may be served at the edge of the mobile data network is device-specific edge applications. Device-specific applications as used herein means applications that are targeted to specific hardware, specific software (such as an operating system) or specific hardware/software combinations. Thus, device-specific applications include applications that target a particular hardware type (e.g., type of mobile phone), applications that target a particular operating system (e.g., Android), and applications that target devices running a particular software application (e.g., Angry Birds). The disclosure and claims herein extend to any application that is specific to any device that may communicate with the mobile data network, whether currently known or developed in the future.

Figure 43:
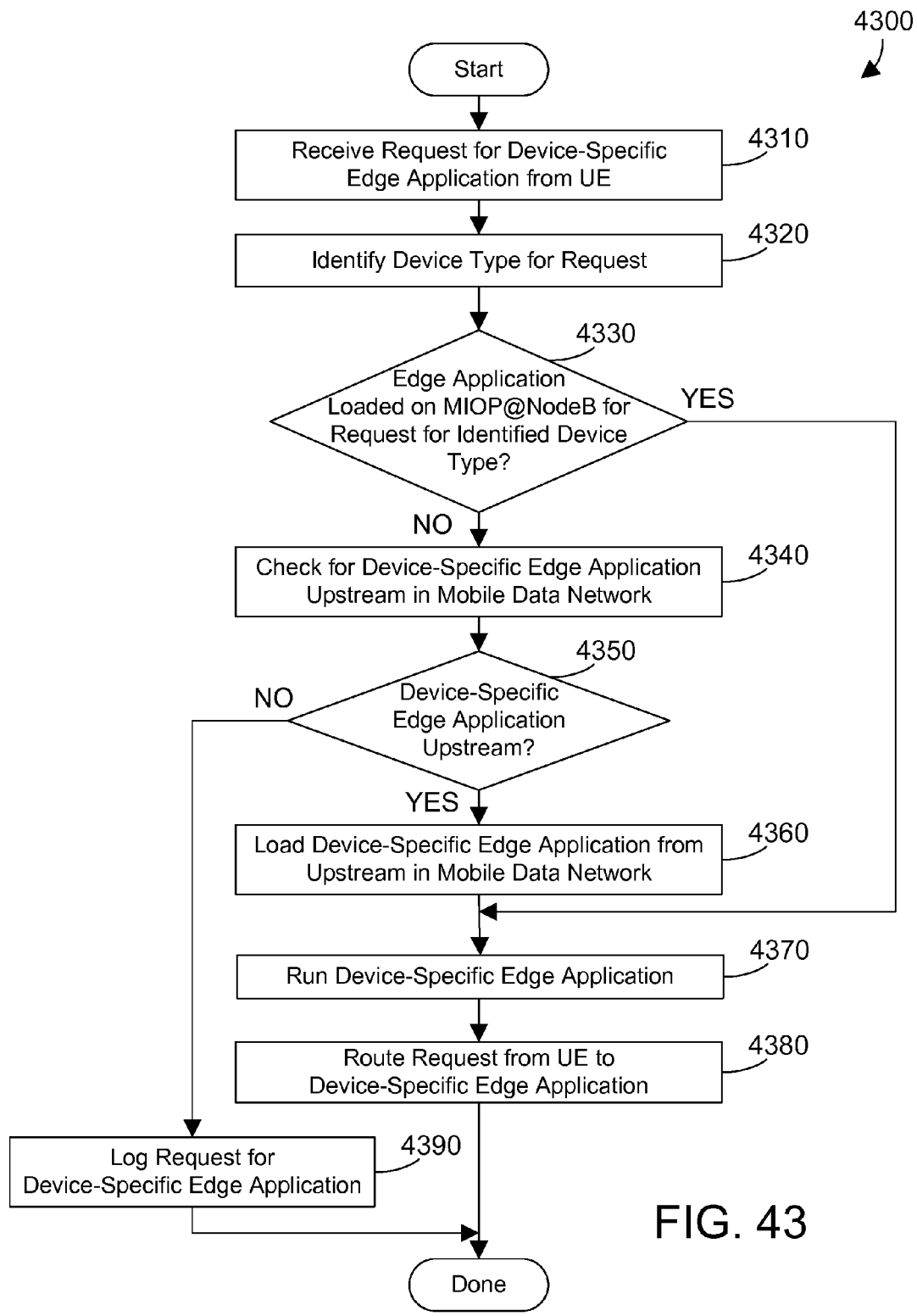
FIG. 43 is a flow diagram of a method for running device-specific edge applications in a mobile data network.

Referring to FIG. 43, a method 4300 for running device-specific edge applications begins when a request is received from user equipment for a device-specific edge application (step 4310). The device type corresponding to the request is identified (step 4320). The identification of device type may be done in any suitable way. For example, the request itself may include parameters that indicate device type. In the alternative, the user equipment may be queried after the request is received in step 4310 to determine its device type. When the edge application for the identified device type is loaded on the MIOP@NodeB in the basestation that received the request (step 4330=YES), the device-specific edge application is run (step 4370), and the request from the user equipment is routed to the device-specific edge application (step 4380). When the edge application for the identified device type is not loaded on the MIOP@NodeB in the basestation that received the request (step 4330=NO), a check is made to see if the device-specific edge application is upstream in the mobile data network (step 4340). If not (step 4350=NO), the request for the device-specific edge application is logged (step 4390). The log of requests can help a system administrator determine demand for particular device-specific edge applications so decisions may be made regarding which device-specific edge applications to make available in the mobile data network. When the device-specific edge application is upstream in the mobile data network (step 4350=YES), such as at MIOP@RNC or at the RNC, the device-specific edge application is loaded to the MIOP@NodeB from upstream in the mobile data network (step 4360). The device-specific edge application is run (step 4370), and the request from the user equipment is routed to the device-specific edge application (step 4380). Method 4300 is then done.

The table in FIG. 44 shows examples of device-specific edge applications. A compiler could be provided that provides native compilation of applications written in Java or other languages for the user equipment. A power manager could be provided that functions according to one or more user-configured options on the user equipment. For example, the power manager may cause lower quality video to run, or may disable certain application or application types on the user equipment to save battery power. A simple example will illustrate. Streaming music is very popular, but is very expensive from a power perspective because the user equipment must receive all the packets and then decompress/decode the packets. The power manager could automatically down-sample the music being streamed. This would required less bandwidth (and thus power) to download the music and also less processing power to decode it once received. The device-specific edge application could down-sample in a variety of ways. For example, it could perform the down-sampling itself, or it could simply request a down-sampled version from the music streaming service, thereby preserving power on the user equipment. A movie editor is another example of a device-specific edge application that performs edits of movie files on the user equipment. Facial recognition is another example of a device-specific edge application that performs facial recognition on digital photographs on the user equipment. A special offers application could provide different sales and promotions targeted to a specific device type. Book deals for a specific e-Reader, music for a particular smart phone, and movies for a particular tablet computer are all examples of special offers targeted to different device types. Of course, many other types of device-specific edge applications may be used, all of which are within the scope of the disclosure and claims herein. Running edge applications at the edge of the mobile data network makes processing power in the mobile data network available to the user equipment. Thus, very compute-intensive applications (e.g., movie editing, facial recognition, etc.) may be performed within the mobile data network instead of within the user equipment, thereby allowing the user equipment to offload work that requires significant resources to the mobile data network. This allows the user equipment to provide a desired level of service without delays that would be associated with performing the compute-intensive work on the user equipment, while still providing the capability of performing compute-intensive work by offloading that work to the edge of the mobile data network.

Figure 45:
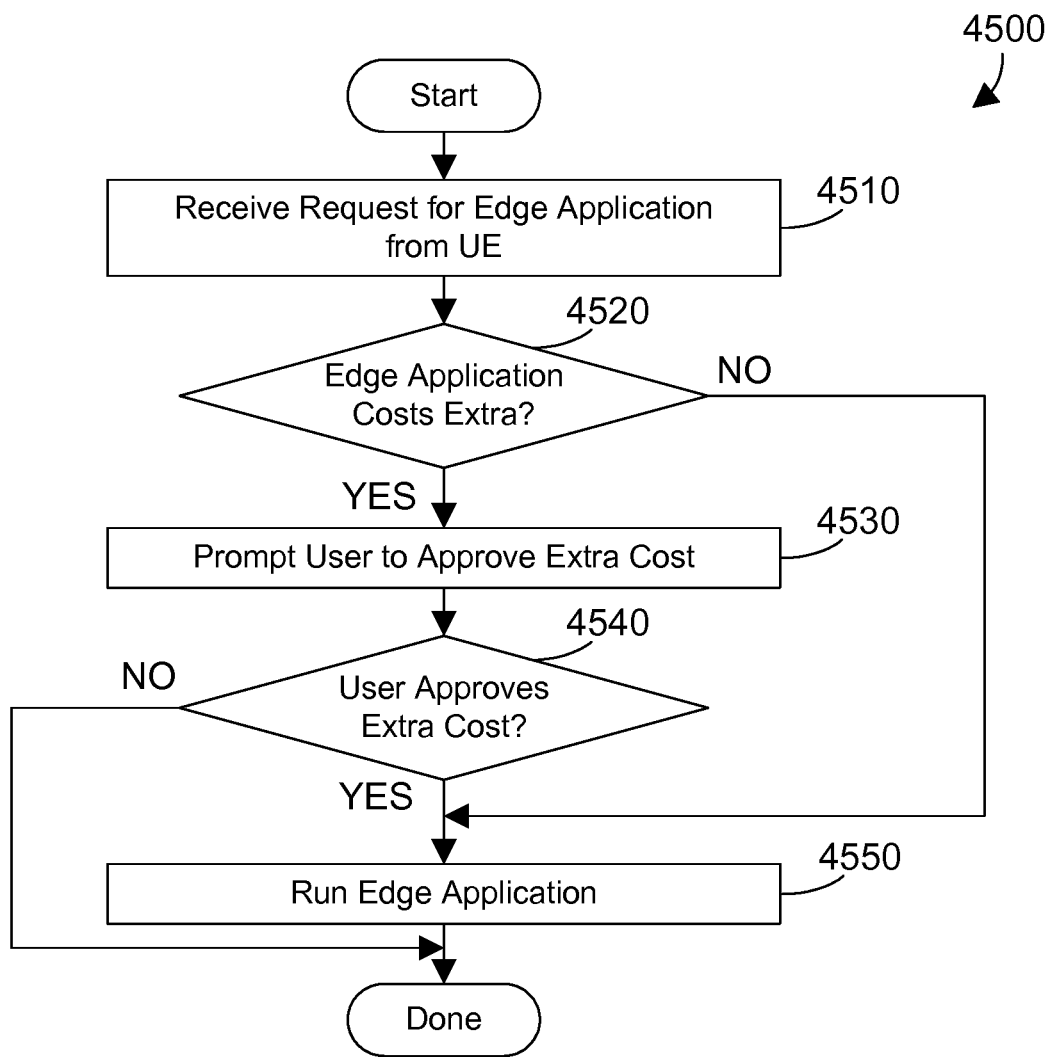
FIG. 45 is a flow diagram of a method for a user to run an edge application after approving extra cost for running the edge application.

Referring to FIG. 45, a method 4500 allows a user access to certain edge applications only if the user approves extra cost to run the edge application. We assume for this example one or more edge applications require the user to pay for running those edge applications. This may be done in any suitable manner, such as a one-time fee per user, a per-use fee, a subscription fee for a particular period of time, etc. A request is received from user equipment for an edge application (step 4510). When the edge application does not cost extra (step 4520=NO), the edge application is run (step 4550). When the edge application costs extra (step 4520=YES), the user is prompted to approve the extra cost (step 4530). When the user does not approve the extra cost (step 4540=NO), the application is not run. When the user approves the extra cost (step 4540=YES), the edge application is run (step 4550). Method 4500 is then done. Note that method 4500 applies to all edge applications, including device-specific edge applications. By providing edge applications at additional cost, the provider of the mobile data network has another way to generate revenue.

Figure 46:
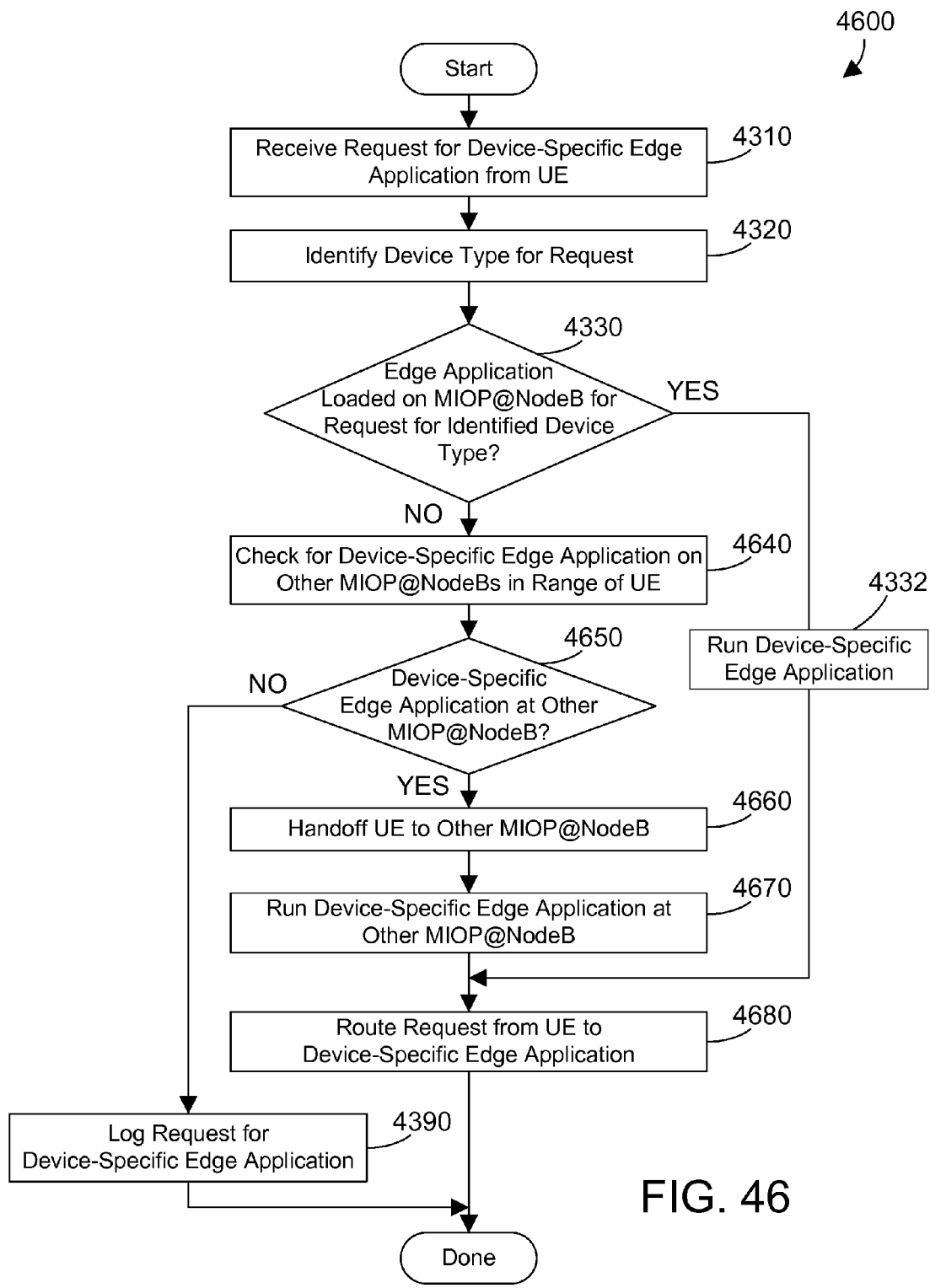
FIG. 46 is a flow diagram of a method for running device-specific edge applications in a mobile data network by handing off user equipment to a different basestation that has the needed device-specific edge application.

Referring to FIG. 46, a method 4600 is a different way for handling a request for a device-specific edge application that does not reside in the MIOP@NodeB in the basestation communicating with the user equipment. A request is received for a device-specific edge application from the user equipment (step 4310). The device type for the request is identified (step 4320). When the device-specific edge application is already loaded on the MIOP@NodeB in the basestation that received the request (step 4330=YES), the device-specific edge application is run (step 4332) and the request from the user equipment is routed to the device-specific edge application (step 4680). When the device-specific edge application is not loaded on the MIOP@NodeB in the basestation that received the request (step 4330=NO), a check is made to see if other MIOP@NodeBs in range of the user equipment have loaded the device-specific edge application (step 4640). When no other MIOP@NodeB in range of the user equipment has loaded the device-specific edge application (step 4650=NO), the request for the device-specific edge application is logged (step 4390). When the device-specific edge application is available in another MIOP@NodeB that is within range of the user equipment (step 4650=YES), the user equipment is handed off to the other MIOP@NodeB (step 4660), the device-specific edge application in the other MIOP@NodeB is run (step 4670), and the request is routed to the device-specific edge application (step 4680). Method 4600 is then done. Note the step 4660 of handing off the user equipment to the other MIOP@NodeB may include several steps. A hand-off of user equipment may be performed between basestations. Thus, handing off the user equipment to the other MIOP@NodeB in step 4660 may include the steps of informing the current basestation to handoff the user equipment, the current basestation handing off the user equipment to another basestation, and forwarding the request from the first MIOP@NodeB to the other MIOP@NodeB.

Step 4640 in FIG. 46 may be performed in any suitable way. For example, the MIOP@NodeB in the basestation that received the request in step 4310 could query the MIOP@RNC to determine if there are other MIOP@NodeBs within range of the user equipment that have the requested device-specific edge application loaded. Because each MIOP@RNC manages many different MIOP@NodeBs, it could easily keep track of which MIOP@NodeBs execute which edge applications. In the alternative, the overlay network allows MIOP@NodeBs to directly communicate with each other. This is useful, for example, when performing macro diversity in the mobile data network. A MIOP@NodeB could thus query other MIOP@NodeBs via the overlay network to determine whether the requested edge application is loaded on other MIOP@NodeBs in range of the user equipment.

Note also that steps from FIGS. 43 and 46 could be combined in any suitable way. Thus, steps 4310 through 4350 could be performed as shown in FIG. 43, and when there is no device-specific edge application upstream (step 4350=NO), steps 4650 through 4680 in FIG. 46 could be performed.

The edge applications referred to in FIGS. 30-46 may include edge application developed and deployed by the operator of the mobile data network, and may also include third party applications as well. Providing the capability of running third party applications at the edge of a mobile data network opens up a whole new potential source of revenue for the network operator. One can readily see from the popularity of apps for mobile phones and tablet computers that the ability to host third-party apps at the edge of the mobile data network gives another source of revenue for both application providers and for the operator of the mobile data network as well.

The mobile data network disclosed herein includes MIOP components that provide a variety of different services that are not possible in prior art mobile data network 100. In the most preferred implementation, the MIOP components do not affect voice traffic in the mobile data network. In addition to performing optimizations that will enhance performance in the form of improved download speeds, lower latency for access, or improved quality of experience in viewing multimedia on the mobile data network, the MIOP architecture also provides additional capabilities that may produce new revenue-generating activities for the carrier. For example, analytics may be performed on subscriber sessions that allow targeting specific subscribers with additional services from the carrier to generate additional revenue. For example, subscribers congregating for a live music event may be sent promotions on paid for media related to that event. In another example, subscribers getting off a train may be sent a coupon promoting a particular shuttle company as they walk up the platform towards the street curb. Also, premium web content in the form of video or other multimedia may be served from local storage and the subscriber would pay for the additional content and quality of service.

While the mobile data network in FIG. 2 and discussed herein is in the context of a 3G mobile data network, the disclosure and claims herein expressly extend to other networks as well, including Long Term Evolution (LTE) networks, flat RAN networks, and code division multiple access (CDMA) networks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

The disclosure and claims are directed to services performed in a mobile data network in a way that is transparent to most of the existing equipment in the mobile data network. The mobile data network includes a radio access network and a core network. A breakout component in the radio access network breaks out data coming from a basestation, and hosts device-specific edge applications that perform one or more mobile network services at the edge of the mobile data network based on the broken out data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A mobile data network comprising:
a plurality of basestations, each basestation communicating with a corresponding antenna that transmits and receives radio signals to and from user equipment, wherein the plurality of basestations are part of a radio access network that communicates with a core network in the mobile data network, each basestation comprising:
a breakout component connected to a NodeB in the basestation and connected to an upstream computer system, the breakout component comprising:
a system controller that controls function of the breakout component;
a service processor that monitors the breakout component and provides control functions for the breakout component;
a security subsystem that provides secure access to keys stored in a non-volatile memory; and
a telco breakout system that comprises:
a first service mechanism that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path;
a set of edge application services in the breakout component that may be invoked by edge applications;
wherein the breakout component provides a first service with respect to internet protocol (IP) data sent to the first user equipment in response to an IP data request in the first data from the first user equipment by serving a device-specific edge application in the breakout component, the breakout component hosting the device-specific edge application, the breakout component providing access to at least one broken out context to the device-specific edge application, and the device-specific edge application providing the first service based on the at least one broken out context, wherein the first device-specific edge application is available to the first user equipment when a user of the first user equipment authorizes an additional charge for use of the first device-specific edge application, wherein, when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application comprises at least one of:
a compiler that provides compilation of applications for the first user equipment;
a power manager that functions according to at least one user-configured option on the first user equipment to disable certain applications or application types from running on the first user equipment to save battery power on the first user equipment;
a movie editor that allows a user using the first user equipment to edit a movie on the first user equipment;
a facial recognition application that performs facial recognition on digital photographs on the first user equipment; and
a special offers application that provides to a user of the first user equipment offers targeted to device type of the first user equipment.

2. A mobile data network comprising:
a plurality of basestations, each basestation communicating with a corresponding antenna that transmits and receives radio signals to and from user equipment, wherein the plurality of basestations are part of a radio access network that communicates with a core network in the mobile data network, each basestation comprising:
a breakout component that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path, wherein the breakout component identifies a type of device for the first user equipment, determines whether a first device-specific edge application corresponding to the first user equipment exists in the breakout component, wherein the first device-specific edge application comprises an executable software application that can be executed by the breakout component when needed to provide a first service to the user equipment with respect to internet protocol (IP) data sent to the user equipment in response to an IP data request in the first data from the user equipment, wherein the breakout component receives the first device-specific edge application from an upstream component in the mobile data network for the first device-specific edge application to exist in the breakout component, and when the first device-specific edge application corresponding to the first user equipment exists in the breakout component, executing the first device-specific edge application to provide the first service to the user equipment, and when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application is available to the first user equipment when a user of the first user equipment authorizes an additional charge for use of the first device-specific edge application.

3. The mobile data network of claim 2 wherein the first device-specific edge application comprises a special offers application that provides to a user of the first user equipment offers targeted to device type of the first user equipment.

4. A mobile data network comprising:
a plurality of basestations, each basestation communicating with a corresponding antenna that transmits and receives radio signals to and from user equipment, wherein the plurality of basestations are part of a radio access network that communicates with a core network in the mobile data network, each basestation comprising:
a breakout component that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path, wherein the breakout component identifies a type of device for the first user equipment, determines whether a first device-specific edge application corresponding to the first user equipment exists in the breakout component, wherein the first device-specific edge application comprises an executable software application that can be executed by the breakout component when needed to provide a first service to the user equipment with respect to internet protocol (IP) data sent to the user equipment in response to an IP data request in the first data from the user equipment, wherein the breakout component receives the first device-specific edge application from an upstream component in the mobile data network for the first device-specific edge application to exist in the breakout component, and when the first device-specific edge application corresponding to the first user equipment exists in the breakout component, executing the first device-specific edge application to provide the first service to the user equipment, and when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application comprises a compiler that provides compilation of applications for the first user equipment.

5. A mobile data network comprising:
a plurality of basestations, each basestation communicating with a corresponding antenna that transmits and receives radio signals to and from user equipment, wherein the plurality of basestations are part of a radio access network that communicates with a core network in the mobile data network, each basestation comprising:
a breakout component that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path, wherein the breakout component identifies a type of device for the first user equipment, determines whether a first device-specific edge application corresponding to the first user equipment exists in the breakout component, wherein the first device-specific edge application comprises an executable software application that can be executed by the breakout component when needed to provide a first service to the user equipment with respect to internet protocol (IP) data sent to the user equipment in response to an IP data request in the first data from the user equipment, wherein the breakout component receives the first device-specific edge application from an upstream component in the mobile data network for the first device-specific edge application to exist in the breakout component, and when the first device-specific edge application corresponding to the first user equipment exists in the breakout component, executing the first device-specific edge application to provide the first service to the user equipment, and when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application comprises a power manager that functions according to at least one user-configured option on the first user equipment to disable certain applications or application types from running on the first user equipment to save battery power on the first user equipment.

6. A mobile data network comprising:
a plurality of basestations, each basestation communicating with a corresponding antenna that transmits and receives radio signals to and from user equipment, wherein the plurality of basestations are part of a radio access network that communicates with a core network in the mobile data network, each basestation comprising:

a breakout component that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path, wherein the breakout component identifies a type of device for the first user equipment, determines whether a first device-specific edge application corresponding to the first user equipment exists in the breakout component, wherein the first device-specific edge application comprises an executable software application that can be executed by the breakout component when needed to provide a first service to the user equipment with respect to internet protocol (IP) data sent to the user equipment in response to an IP data request in the first data from the user equipment, wherein the breakout component receives the first device-specific edge application from an upstream component in the mobile data network for the first device-specific edge application to exist in the breakout component, and when the first device-specific edge application corresponding to the first user equipment exists in the breakout component, executing the first device-specific edge application to provide the first service to the user equipment, and when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application comprises a movie editor that allows a user using the first user equipment to edit a movie on the first user equipment.

7. A mobile data network comprising:

a plurality of basestations, each basestation communicating with a corresponding antenna that transmits and receives radio signals to and from user equipment, wherein the plurality of basestations are part of a radio access network that communicates with a core network in the mobile data network, each basestation comprising:

a breakout component that defines an existing first data path in the radio access network for non-broken out data, defines a second data path for broken out data, identifies first data corresponding to first user equipment received from a corresponding basestation as data to be broken out, sends the first data on the second data path, and forwards other data that is not broken out on the first data path, wherein the breakout component identifies a type of device for the first user equipment, determines whether a first device-specific edge application corresponding to the first user equipment exists in the breakout component, wherein the first device-specific edge application comprises an executable software application that can be executed by the breakout component when needed to provide a first service to the user equipment with respect to internet protocol (IP) data sent to the user equipment in response to an IP data request in the first data from the user equipment, wherein the breakout component receives the first device-specific edge application from an upstream component in the mobile data network for the first device-specific edge application to exist in the breakout component, and when the first device-specific edge application corresponding to the first user equipment exists in the breakout component, executing the first device-specific edge application to provide the first service to the user equipment, and when the first device-specific edge application is not available in the breakout component, determining whether the first device-specific edge application is available in a second breakout component in a second basestation in range of the first user equipment, and when the first device-specific edge application is available in a second breakout component in the second basestation in range of the first user equipment, the breakout component hands off the first user equipment to the second breakout component, and the second breakout component executes the first device-specific edge application to provide the first service, wherein the first device-specific edge application comprises a facial recognition application that performs facial recognition on digital photographs on the first user equipment.

* * * * *